(12) United States Patent
Ikemura et al.

(10) Patent No.: US 12,384,259 B2
(45) Date of Patent: Aug. 12, 2025

(54) GROUND POWER SUPPLYING APPARATUS, METHOD FOR CONTROLLING GROUND POWER SUPPLYING APPARATUS, AND NONTRANSITORY COMPUTER RECORDING MEDIUM

(71) Applicant: TOYOTA JIDOSHA KABUSHIKI KAISHA, Toyota (JP)

(72) Inventors: Ryosuke Ikemura, Susono (JP); Shogo Tsuge, Fuji (JP); Toshiya Hashimoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 664 days.

(21) Appl. No.: 17/834,489

(22) Filed: Jun. 7, 2022

(65) Prior Publication Data

US 2022/0402387 A1    Dec. 22, 2022

(30) Foreign Application Priority Data

Jun. 17, 2021  (JP) ................. 2021-101170

(51) Int. Cl.
| | |
|---|---|
| *B60L 53/126* | (2019.01) |
| *B60L 53/10* | (2019.01) |
| *B60L 53/30* | (2019.01) |
| *B60L 53/38* | (2019.01) |
| *B60L 53/65* | (2019.01) |
| *H02J 50/12* | (2016.01) |
| *H02J 50/60* | (2016.01) |
| *H02J 50/90* | (2016.01) |

(52) U.S. Cl.
CPC ............ *B60L 53/126* (2019.02); *B60L 53/11* (2019.02); *B60L 53/305* (2019.02); *B60L 53/38* (2019.02); *B60L 53/65* (2019.02); *H02J 50/12* (2016.02); *H02J 50/60* (2016.02); *H02J 50/90* (2016.02)

(58) Field of Classification Search
CPC ...... B60L 53/126; B60L 53/11; B60L 53/305; B60L 53/38; H02J 50/90; H02J 50/12; H02J 50/60
USPC ................................................ 320/108, 109
See application file for complete search history.

(56) References Cited

U.S. PATENT DOCUMENTS

| | | | | |
|---|---|---|---|---|
| 10,141,785 | B2* | 11/2018 | Son | .................. H02J 50/80 |
| 10,583,745 | B2* | 3/2020 | Iwamoto | ................ B60L 53/36 |
| 2016/0001669 | A1 | 1/2016 | Ichikawa | |
| 2016/0336804 | A1* | 11/2016 | Son | .................. H02J 50/12 |

FOREIGN PATENT DOCUMENTS

JP        2020-127313 A       8/2020

\* cited by examiner

*Primary Examiner* — Richard V Muralidar
(74) *Attorney, Agent, or Firm* — Oliff PLC

(57) ABSTRACT

A ground power supplying apparatus provided with a power transmission apparatus having a resonance circuit and transmitting power to the vehicle and a control device shifting a state of the ground power supplying apparatus to a standby state when a predetermined suspension condition stands if the state of the ground power supplying apparatus is a main power transmission state or a power transmission active state and shifting a state of the ground power supplying apparatus to the power transmission active state when the suspension condition no longer stands if the state of the ground power supplying apparatus is the standby state.

19 Claims, 14 Drawing Sheets

GROUND POWER SUPPLYING APPARATUS, METHOD FOR CONTROLLING GROUND POWER SUPPLYING APPARATUS, AND NONTRANSITORY COMPUTER RECORDING MEDIUM

FIELD

The present disclosure relates to a ground power supplying apparatus, a method for controlling a ground power supplying apparatus, and a nontransitory computer recording medium.

BACKGROUND

Noncontact power supplying systems using transmission methods such as magnetic field coupling (electromagnetic induction), electric field coupling, magnetic field resonant coupling (magnetic field resonance), and electric field resonant coupling (electric field resonance) to transfer power from a ground power supplying apparatus provided on a ground surface to a running vehicle by noncontact, have been known. As such a noncontact power supplying system, Japanese Unexamined Patent Publication No. 2020-127313 discloses a noncontact power supplying system configured so that when a plurality of processing routines relating to the supply of power are performed in a predetermined order by transfer of data with a ground power supplying apparatus and processing is interrupted in the middle of that, the plurality of processing routines are restarted from the start if the interrupted location is before completion of a predetermined processing routine set in advance and the plurality of processing routines are performed from the start to the predetermined processing routine, then the processing is restarted from the interrupted location if the interrupted location is after completion of the predetermined processing routine.

SUMMARY

However, if restarting power transfer after interruption of power transfer, there is the problem that if having to perform the processing for power transfer from the start, time is taken until power transfer is restarted.

The present disclosure was made in consideration of this problem. It has as its object to enable power transfer to be restarted quickly if power transfer is interrupted.

To solve the above technical problem, the ground power supplying apparatus for transmitting power to a vehicle by noncontact according to an aspect of the present disclosure is comprised of a power transmission apparatus having a resonance circuit and transmitting power to the vehicle and a control device configured to shift a state of the ground power supplying apparatus to a standby state when a predetermined suspension condition is satisfied if the state of the ground power supplying apparatus is a main power transmission state or a power transmission active state and to shift a state of the ground power supplying apparatus to the power transmission active state when the suspension condition is no longer satisfied if the state of the ground power supplying apparatus is the standby state. The main power transmission state is a state where power is supplied to the resonance circuit and power is being supplied to the vehicle, the power transmission active state is a state where weak power is supplied to the resonance circuit and power can be transmitted to the vehicle, and the standby state is a state where the supply of power to the resonance circuit is stopped and where the power transmission active state can be shifted to by supplying weak power to the resonance circuit.

Further, the method for controlling a ground power supplying apparatus having a resonance circuit and transmitting power to a vehicle by noncontact according to another aspect of the present disclosure comprises shifting a state of the ground power supplying apparatus to a standby state where the supply of power to the resonance circuit is stopped and where the power transmission active state can be shifted to by supplying weak power to the resonance circuit when a predetermined suspension condition is satisfied if the state of the ground power supplying apparatus is a main power transmission state where power is supplied to the resonance circuit and power is being transmitted to the vehicle or a power transmission active state where weak power is supplied to the resonance circuit and power can be transmitted to the vehicle and shifting the state of the ground power supplying apparatus to the power transmission active state when the suspension condition is no longer satisfied if the state of the ground power supplying apparatus is the standby state.

Further, according to another aspect of the present disclosure, there is provided a nontransitory computer recording medium including a program for making a processor of a ground power supplying apparatus having a resonance circuit and transmitting power to a vehicle by noncontact shift a state of the ground power supplying apparatus to a standby state where the supply of power to the resonance circuit is stopped and where the power transmission active state can be shifted to by supplying weak power to the resonance circuit when a predetermined suspension condition is satisfied if the state of the ground power supplying apparatus is a main power transmission state where power is supplied to the resonance circuit and power is being transmitted to the vehicle or a power transmission active state where weak power is supplied to the resonance circuit and power can be transmitted to the vehicle and shift the state of the ground power supplying apparatus to the power transmission active state when the suspension condition is no longer satisfied if the state of the ground power supplying apparatus is the standby state.

According to these aspects of the present disclosure, it is possible to quickly restart power transfer if interrupting power transfer.

DESCRIPTION OF EMBODIMENTS

Figure 1:
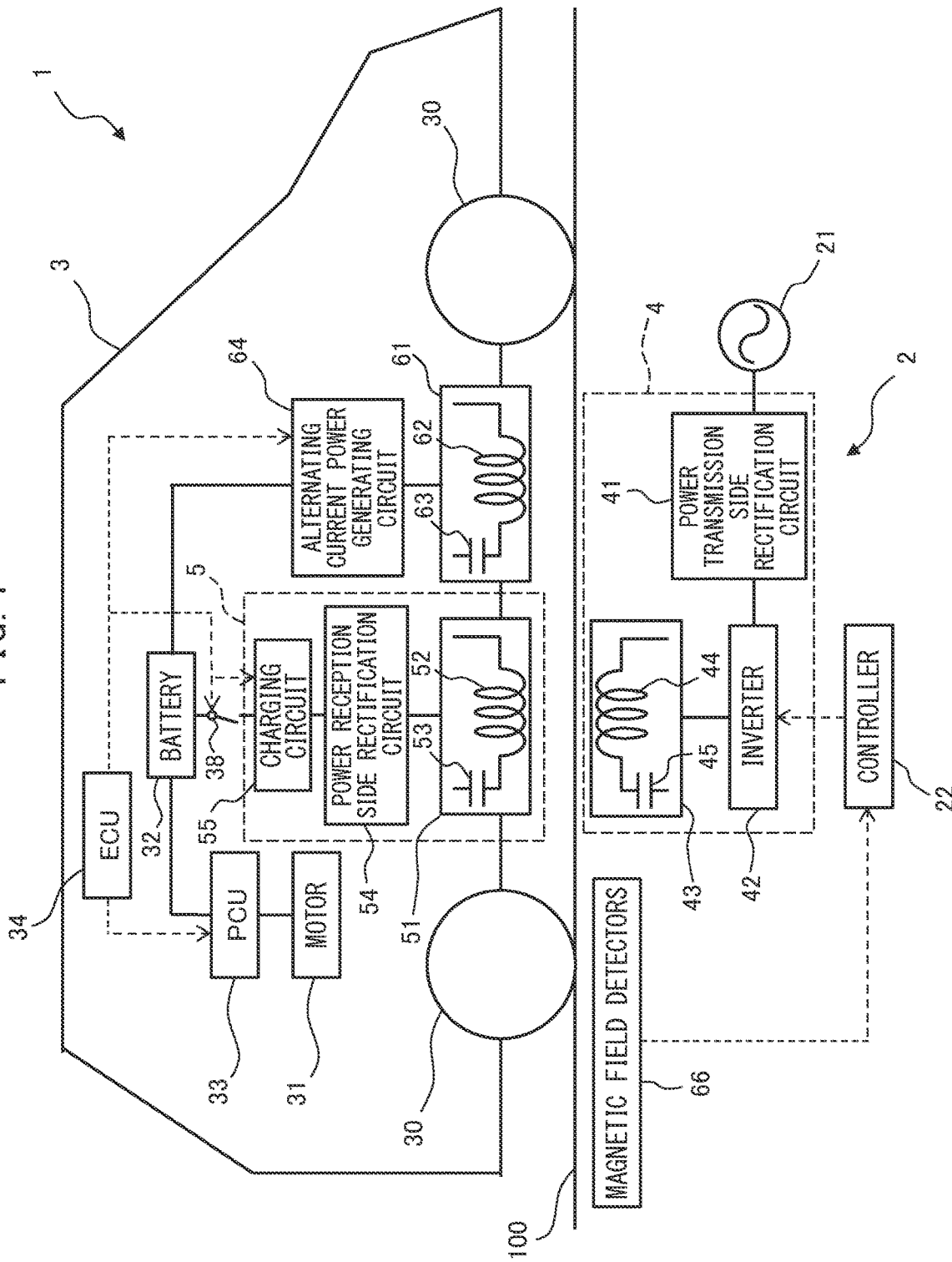
FIG. 1 is a view schematically showing the configuration of a noncontact power supplying system.

Below, referring to the drawings, embodiments will be explained in detail. Note that, in the following explanation, similar elements will be assigned the same reference notations.

Overall Configuration of Noncontact Power Supplying System

FIG. 1 is a view schematically showing the configuration of a noncontact power supplying system 1. The noncontact power supplying system 1 has a ground power supplying apparatus 2 and a vehicle 3 running on a road 100, and transfers power by noncontact from the ground power supplying apparatus 2 to the vehicle 3 by magnetic field resonant coupling (magnetic field resonance). In particular, in the present embodiment, the noncontact power supplying system 1 transfers power by noncontact from the ground power supplying apparatus 2 to the vehicle 3 while the vehicle 3 is running. Therefore, the ground power supplying apparatus 2 transmits power to the vehicle 3 by noncontact while the vehicle 3 is running, and the vehicle 3 receives power from the ground power supplying apparatus 2 by noncontact while the vehicle 3 is running. The ground power supplying apparatus 2 has a power transmission apparatus 4 configured to transmit power by noncontact, while the vehicle 3 has a power reception apparatus 5 configured to receive power from the power transmission apparatus 4 by noncontact. As shown in FIG. 1, the power transmission apparatus 4 is buried in the road 100 (in the ground), for example, at the center of the lane on which the vehicle 3 runs.

Note that, the term "while (a vehicle is) running" or "running vehicle" means the state where the vehicle 3 is positioned on the road for running. Therefore, the term "while (a vehicle is) running" or "running vehicle" includes not only the state where the vehicle 3 is actually running at any speed greater than zero, but also, for example, the state where it is stopped on the road while, for example, waiting for a traffic light to change. On the other hand, even if the vehicle 3 is positioned on a road, if, for example, it is parked, this is not included in "while (a vehicle is) running" or "running vehicle"

Configuration of Ground Power Supplying Apparatus

As shown in FIG. 1, the ground power supplying apparatus 2 is provided with a power source 21 and a controller 22, in addition to the power transmission apparatus 4. The power source 21 and the controller 22 may be buried inside the road 100, and may be arranged at a location (including ground) separate from the inside of the road 100.

The power source 21 supplies power to the power transmission apparatus 4. The power source 21, for example, is a commercial alternating current power supply for supplying single-phase alternating current power. Note that, the power source 21 may be another type of an alternating current power supply for supplying three-phase alternating current power, or may be a direct current power supply such as a fuel cell.

The power transmission apparatus 4 transmits the power supplied from the power source 21 to the vehicle 3. The power transmission apparatus 4 has a power transmission side rectification circuit 41, inverter 42, and power transmission side resonance circuit 43. In the power transmission apparatus 4, the alternating current power supplied from the power source 21 is rectified and converted to direct current power at the power transmission side rectification circuit 41, this direct current power is converted to alternating current power at the inverter 42, and this alternating current power is supplied to the power transmission side resonance circuit 43.

The power transmission side rectification circuit 41 is electrically connected to the power source 21 and inverter 42. The power transmission side rectification circuit 41 rectifies the alternating current power supplied from the power source 21 to convert it to direct current power, and supplies the direct current power to the inverter 42. The power transmission side rectification circuit 41 is, for example, an AC/DC converter.

The inverter 42 is electrically connected to the power transmission side rectification circuit 41 and power transmission side resonance circuit 43. The inverter 42 converts the direct current power supplied from the power transmission side rectification circuit 41 to an alternating current power of a frequency higher than the alternating current power of the power source 21 (high frequency power), and supplies the high frequency power to the power transmission side resonance circuit 43.

The power transmission side resonance circuit 43 has a resonator comprised of a coil 44 and capacitor 45. The various parameters of the coil 44 and capacitor 45 (outside diameter and inside diameter of the coil 44, the number of turns of the coil 44, electrostatic capacity of the capacitor 45) are determined so that the resonance frequency of the power transmission side resonance circuit 43 becomes a predetermined set value. The predetermined set value is, for example, 10 kHz to 100 GHz, preferably is the 85 kHz determined by the SAE TIR J2954 standard as the frequency band for noncontact power transfer.

The power transmission side resonance circuit 43 is arranged at the center of the lane on which the vehicle 3 runs so that the center of the coil 44 is positioned at the center of the lane. If the high frequency power supplied from the inverter 42 is applied to the power transmission side resonance circuit 43, the power transmission side resonance circuit 43 generates an alternating magnetic field for power transmission. Note that, if the power source 21 is a direct current power supply, the power transmission side rectification circuit 41 may be omitted.

The controller 22 is, for example, a general-purpose computer, and performs various control operations of the ground power supplying apparatus 2. For example, the controller 22 is electrically connected to the inverter 42 of the power transmission apparatus 4, and controls the inverter 42 so as to control power transmission by the power transmission apparatus 4. Furthermore, the controller 22 controls a later explained ground side first communication device 81 and ground side second communication device 82.

Figure 2:
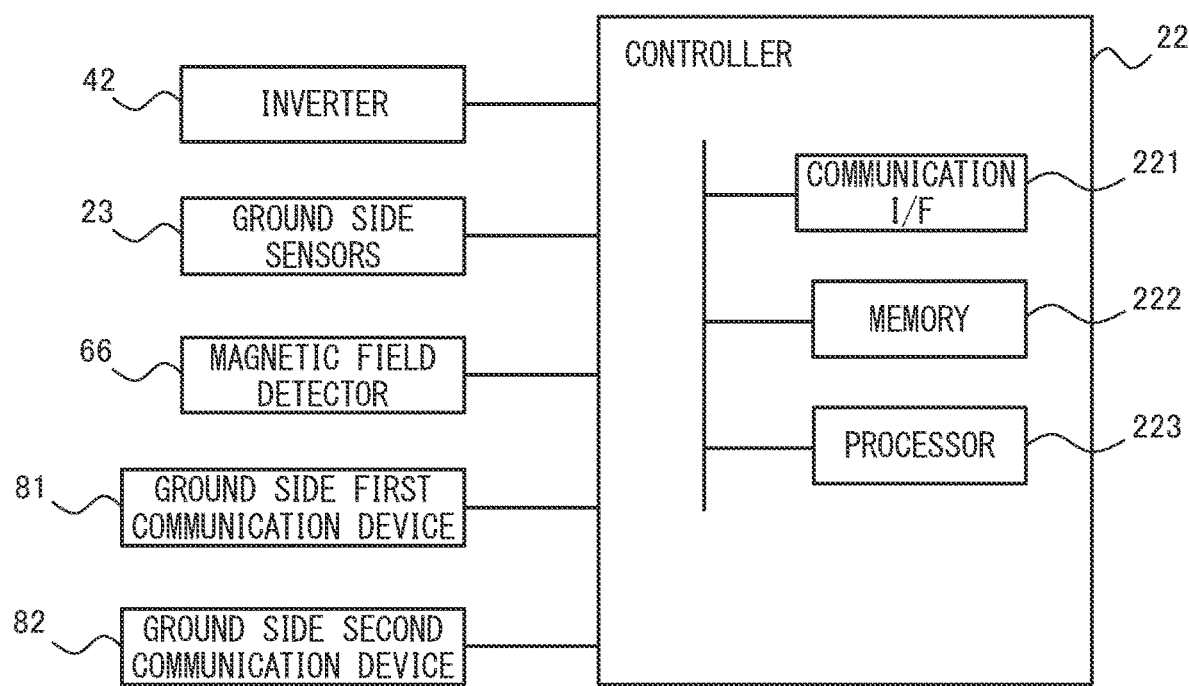
FIG. 2 is a schematic view of the configuration of a controller and equipment connected to the controller.

FIG. 2 is a schematic view of the configuration of the controller 22 and equipment connected to the controller 22. The controller 22 is provided with a communication interface 221, memory 222, and processor 223. The communication interface 221, memory 222, and processor 223 are connected to each other through signal wires.

The communication interface 221 has an interface circuit for connecting the controller 22 to various equipment forming the ground power supplying apparatus 2 (for example, the inverter 42, the later explained ground side sensors 23, ground side first communication device 81, and ground side second communication device 82) The controller 22 communicates with other equipment through the communication interface 221.

The memory 222, for example, has a volatile semiconductor memory (for example, RAM), nonvolatile semiconductor memory (for example, ROM), or equivalents. The memory 222 stores, for example, a computer program for performing various processing at the processor 223, and various data used when various processing is performed by the processor 223. The memory 222, for example, stores a list of vehicle identification information of vehicles which can be supplied with power by the ground power supplying apparatus 2 (below, referred to as the "identification information list"), and vehicle identification information of the vehicle 3 currently being supplied with power.

The processor 223 has one or more CPUs (central processing units) and their peripheral circuits. The processor 223 may further have a processing circuit such as a logic unit or arithmetic unit. The processor 223 performs various processing based on the computer program stored in the memory 222.

Further, as shown in FIG. 2, the ground power supplying apparatus 2 is further provided with ground side sensors 23. The ground side sensors 23 detect states of the ground power supplying apparatus 2. In the present embodiment, the ground side sensors 23, for example, include a power transmission apparatus current sensor for detecting the current flowing to various equipment of the power transmission apparatus 4 (in particular, the power transmission side resonance circuit 43, inverter 42, and power transmission side rectification circuit 41), a power transmission apparatus voltage sensor for detecting the voltage applied to various equipment of the power transmission apparatus 4, a power transmission apparatus temperature sensor for detecting a temperature of various equipment of the power transmission apparatus 4, a foreign object sensor for detecting a foreign object on the road in which the power transmission apparatus 4 is buried, and a living object sensor for detecting a living object on the road in which the power transmission apparatus 4 is buried. The outputs of the ground side sensors 23 are input to the controller 22.

Note that, the power transmission apparatus 4 may also be configured so as to enable power to be received from the vehicle 3. In this case, the power transmission apparatus 4 has a device or circuit for supplying the received power to the power source 21, similarly to the later explained power reception apparatus 5 of the vehicle 3. Further, in this case, the power transmission apparatus 4 may utilize a resonator comprised of the above coil 44 and capacitor 45, in order to receive power from the vehicle 3.

Configuration of Vehicle

On the other hand, as shown in FIG. 1, the vehicle 3 is provided with a motor 31, battery 32, power control unit (PCU) 33, and electronic control unit (ECU) 34, in addition to the power reception apparatus 5. In the present embodiment, the vehicle 3 is an electric vehicle (EV) using the motor 31 to drive the vehicle 3. However, the vehicle 3 may also be a hybrid vehicle (HV) using not only the motor 31, but also an internal combustion engine to drive the vehicle 3.

The motor 31 is, for example, an alternating current synchronous motor, and functions as an electric motor and a generator. The motor 31 is driven using the power stored in the battery 32 as a source of power, when functioning as an electric motor. The output of the motor 31 is transmitted through a decelerator and shaft to the wheels 30. On the other hand, at the time of deceleration of the vehicle 3, the motor 31 is driven by rotation of the wheels 30, and the motor 31 functions as a generator to generate regenerated power.

The battery 32 is a rechargeable secondary battery, and is, for example, comprised of a lithium ion battery, nickel-hydrogen battery, or the like. The battery 32 stores the power required for running the vehicle (for example, the drive power of the motor 31). If the power which the power reception apparatus 5 receives from the power transmission apparatus 4 is supplied to the battery 32, the battery 32 is charged. Further, if the regenerated power generated by the motor 31 is supplied to the battery 32, the battery 32 is charged. If the battery 32 is charged, the state of charge (SOC) of the battery 32 is restored. Note that, the battery 32 may also be recharged through a charging port provided at the vehicle 3 by an outside power source other than the ground power supplying apparatus 2.

The PCU 33 is electrically connected to the battery 32 and motor 31. The PCU 33 has an inverter, booster converter, and DC/DC converter. The inverter converts the direct current power supplied from the battery 32 to alternating current power, and supplies the alternating current power to the motor 31. On the other hand, the inverter converts the alternating current power generated by the motor 31 (regenerated power) to direct current power, and supplies the direct current power to the battery 32. The booster converter boosts the voltage of the battery 32 in accordance with need, when the power stored in the battery 32 is supplied to the motor 31. The DC/DC converter lowers the voltage of the battery 32 when the power stored in the battery 32 is supplied to the headlights or other electronic equipment.

The power reception apparatus 5 receives power from the power transmission apparatus 4, and supplies the received power to the battery 32. The power reception apparatus 5 has a power reception side resonance circuit 51, power reception side rectification circuit 54, and charging circuit 55.

The power reception side resonance circuit 51 is arranged at a floor part of the vehicle 3 so that the distance from the road surface is small. In the present embodiment, the power reception side resonance circuit 51 is arranged at the center of the vehicle 3 in the vehicle width direction. The power reception side resonance circuit 51 has a configuration similar to the power transmission side resonance circuit 43, and has a resonator comprised of a coil 52 and capacitor 53. The various parameters of the coil 52 and capacitor 53

(outside diameter and inside diameter of the coil 52, the number of turns of the coil 52, electrostatic capacity of the capacitor 53, etc.) are determined so that the resonance frequency of the power reception side resonance circuit 51 conforms to the resonance frequency of the power transmission side resonance circuit 43. Note that, if the amount of deviation of the resonance frequency of the power reception side resonance circuit 51 and the resonance frequency of the power transmission side resonance circuit 43 is small, for example, the resonance frequency of the power reception side resonance circuit 51 is within a range of ±20% of the resonance frequency of the power transmission side resonance circuit 43, the resonance frequency of the power reception side resonance circuit 51 does not necessarily have to conform to the resonance frequency of the power transmission side resonance circuit 43.

As shown in FIG. 1, when the power reception side resonance circuit 51 faces the power transmission side resonance circuit 43, if an alternating magnetic field is generated by the power transmission side resonance circuit 43, vibration of the alternating magnetic field is transmitted to the power reception side resonance circuit 51 which resonates by the same resonance frequency as the power transmission side resonance circuit 43. As a result, an induction current flows in the power reception side resonance circuit 51 due to electromagnetic induction, and an induced electromotive force is generated at the power reception side resonance circuit 51 by the induction current. That is, the power transmission side resonance circuit 43 transmits power to the power reception side resonance circuit 51, and the power reception side resonance circuit 51 receives power from the power transmission side resonance circuit 43.

The power reception side rectification circuit 54 is electrically connected to the power reception side resonance circuit 51 and charging circuit 55. The power reception side rectification circuit 54 rectifies the alternating current power supplied from the power reception side resonance circuit 51 to convert it to direct current power, and supplies the direct current power to the charging circuit 55. The power reception side rectification circuit 54 is, for example, an AC/DC converter.

The charging circuit 55 is electrically connected to the power reception side rectification circuit 54 and the battery 32. In particular, it is connected to the battery 32 through a relay 38. The charging circuit 55 converts a voltage level of the direct current power supplied from the power reception side rectification circuit 54 to the voltage level of the battery 32, and supplies the power to the battery 32. If the power transmitted from the power transmission apparatus 4 is supplied by the power reception apparatus 5 to the battery 32, the battery 32 is charged. The charging circuit 55 is, for example, a DC/DC converter.

The ECU 34 performs various control operations of the vehicle 3. For example, the ECU 34 is electrically connected to the charging circuit 55 of the power reception apparatus 5, and controls the charging circuit 55 so as to control the charging of the battery 32 by the power transmitted from the power transmission apparatus 4. Further, the ECU 34 is electrically connected to the PCU 33, and controls the PCU 33 so as to control the transfer of power between the battery 32 and the motor 31. Furthermore, the ECU 34 controls a vehicle side first communication device 71 and vehicle side second communication device 72, which will be explained later.

Figure 3:
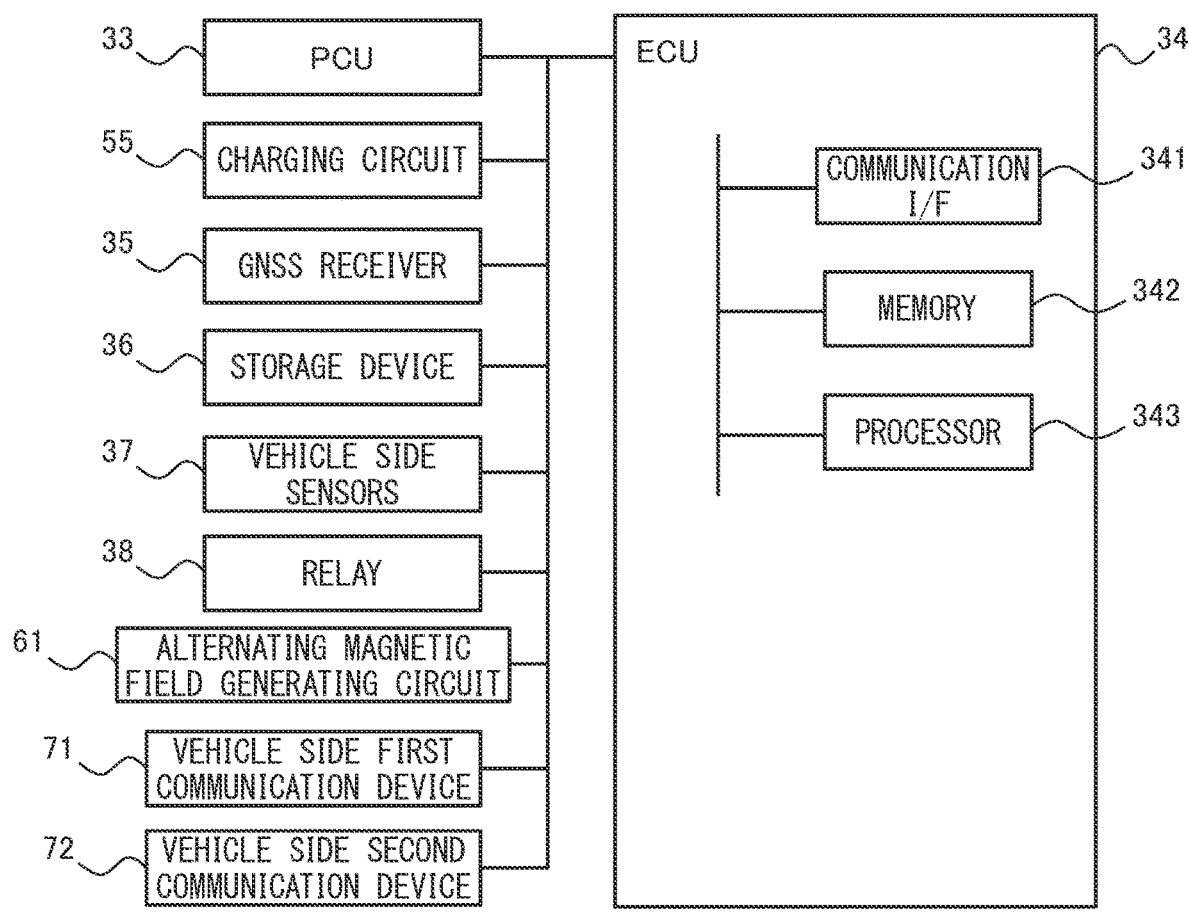
FIG. 3 is a schematic view of the configuration of an ECU and equipment connected to the ECU.

FIG. 3 is a schematic view of the configuration of the ECU 34 and equipment connected to the ECU 34. The ECU 34 has a communication interface 341, memory 342, and processor 343. The communication interface 341, memory 342, and processor 343 are connected to each other through signal wires.

The communication interface 341 has an interface circuit for connecting the ECU 34 to an internal vehicle network based on the CAN (Controller Area Network) or other standard. The ECU 34 communicates with other equipment through the communication interface 341.

The memory 342, for example, has a volatile semiconductor memory (for example, RAM) and nonvolatile semiconductor memory (for example, ROM). The memory 342 stores, for example, a computer program for performing various processing at the processor 343, and various data used when various processing is performed by the processor 343.

The processor 343 has one or more CPUs (central processing units) and their peripheral circuits. The processor 343 may further have a logic unit or arithmetic unit or other such processing circuit. The processor 343 performs various processing based on the computer program stored in the memory 342.

Further, as shown in FIG. 3, the vehicle 3 is further provided with a GNSS receiver 35, storage device 36, a plurality of vehicle side sensors 37, and a relay 38. The GNSS receiver 35, storage device 36, vehicle side sensors 37, and relay 38 are electrically connected to the ECU 34.

The GNSS receiver 35 detects the current position of the vehicle 3 (for example, the latitude and longitude of the vehicle 3), based on the positioning information of a plurality (for example, three or more) positioning satellites. Specifically, the GNSS receiver 35 captures a plurality of positioning satellites, and receives signals emitted from the positioning satellites. Further, the GNSS receiver 35 calculates the distances to the positioning satellites based on the times of emission and times of reception of the signals, and detects the current position of the vehicle 3 based on the distances to the positioning satellites and the positions of the positioning satellites (orbital information). The output of the GNSS receiver 35, that is, the current position of the vehicle 3 detected by the GNSS receiver 35, is transmitted to the ECU 34. The GNSS receiver 35 may include, for example, a GPS receiver.

The storage device 36 stores data. The storage device 36 is, for example, provided with a hard disk drive (HDD), solid state drive (SSD), or optical recording medium. In the present embodiment, the storage device 36 stores map information. The map information includes, in addition to information relating to the roads, the installation position information of the ground power supplying apparatuses 2 and other information. The ECU 34 acquires the map information from the storage device 36. Note that, the storage device 36 need not include the map information. In this case, the ECU 34 may acquire the map information from the outside of the vehicle 3 (for example, the later explained the server 91) through the vehicle side first communication device 71.

The vehicle side sensors 37 detect the states of the vehicle 3. In the present embodiment, the vehicle side sensors 37 include, as sensors for detecting the states of the vehicle 3, a speed sensor for detecting the speed of the vehicle 3, a battery temperature sensor for detecting the temperature of the battery 32, a power reception apparatus temperature sensor for detecting the temperature of various equipment of the power reception apparatus 5 (in particular, the power reception side resonance circuit 51 and power reception side rectification circuit 54), a battery current sensor for detecting the value of the charge current and value of the discharge current of the battery 32, a power reception apparatus current sensor for detecting the current flowing to various equipment of the power reception apparatus 5, and a power reception apparatus voltage sensor for detecting voltage applied to various equipment of the power reception apparatus 5. The outputs of the vehicle side sensors 37 are input to the ECU 34.

The relay 38 is arranged between the battery 32 and power reception apparatus 5, and connects and disconnects the battery 32 and power reception apparatus 5. When the relay 38 is connected, the power received by the power reception apparatus 5 is supplied to the battery 32. However, when the relay 38 is disconnected, current does not flow from the power reception apparatus 5 to the battery 32, and accordingly the power reception apparatus 5 can no longer substantially receive power.

Note that, the power reception apparatus 5 may also be configured so as to transmit power to the ground power supplying apparatus 2. In this case, the power reception apparatus 5 is configured to transmit the power of the battery 32 to the ground power supplying apparatus 2, similarly to the power transmission apparatus 4 of the ground power supplying apparatus 2. Further, in this case, the power reception apparatus 5 may also utilize the above-mentioned resonator comprised of the coil 52 and capacitor 53 to transmit power to the ground power supplying apparatus 2.

Configuration of Lateral Deviation Detection Device

In order to efficiently perform noncontact power transfer, the positional deviation between the power transmission apparatus 4 of the ground power supplying apparatus 2 and the power reception apparatus 5 of the vehicle 3 must be small. For this reason, in the present embodiment, the noncontact power supplying system 1 has a lateral deviation detection device for detecting the positional deviation between the power transmission apparatus 4 and the power reception apparatus 5 in the direction perpendicular to the direction of advance of the vehicle 3 (below, referred to as the "lateral deviation"). In particular, in the present embodiment, the lateral deviation detection device is provided with an alternating magnetic field generation circuit 61 and alternating current power generation circuit 64 provided at the vehicle 3, and magnetic field detectors 66 provided at the ground power supplying apparatus 2.

The alternating magnetic field generation circuit 61 generates an alternating magnetic field for detecting a relative positional relationship between the power transmission apparatus 4 (in particular, the power transmission side resonance circuit 43) and the power reception apparatus 5 (in particular, the power reception side resonance circuit 51) (below, referred to as the "alternating magnetic field for detecting lateral deviation"). The alternating magnetic field generation circuit 61 is arranged at a floor part of the vehicle 3 so that the distance from the road surface is small. In the present embodiment, the alternating magnetic field generation circuit 61 is arranged at the center of the vehicle 3 in the vehicle width direction, and is arranged further to the front than the power reception side resonance circuit 51 in the front-back direction of the vehicle 3. Note that, the alternating magnetic field generation circuit 61 may also be arranged at the same position as the power reception side resonance circuit 51 or further to the back than the power reception side resonance circuit 51, in the front-back direction of the vehicle 3.

The alternating magnetic field generation circuit 61 has a configuration similar to the power transmission side resonance circuit 43, and has a resonator comprised of a coil 62 and capacitor 63. The various parameters of the coil 62 and capacitor 63 (outside diameter and inside diameter of coil 62, the number of turns of coil 62, electrostatic capacity of capacitor 63, etc.) are determined so that the resonance frequency of the alternating magnetic field generation circuit 61 is a predetermined set value. The predetermined set value is set to a value different from the resonance frequency of the power transmission side resonance circuit 43, that is, the resonance frequency of magnetic field resonant coupling. Note that, the alternating magnetic field generation circuit 61 does not have to generate a magnetic field by resonance, and accordingly does not have to have the capacitor 63.

The alternating current power generation circuit 64 is electrically connected to the battery 32 and alternating magnetic field generation circuit 61. The alternating current power generation circuit 64 generates alternating current power, and supplies the alternating current power to the alternating magnetic field generation circuit 61. For example, the alternating current power generation circuit 64 has an oscillation circuit and amplifier. The oscillation circuit is, for example, configured from an inverter, and converts the direct current power supplied from the battery 32 to a predetermined frequency alternating current power. The amplifier amplifies the output power of the oscillation circuit (alternating current power).

As shown in FIG. 1, the alternating current power generation circuit 64 is electrically connected to the ECU 34, and the ECU 34 controls the alternating current power generation circuit 64. The alternating current power generation circuit 64 converts the direct current power from the battery 32 to alternating current power based on a command from the ECU 34, and supplies the alternating current power to the alternating magnetic field generation circuit 61.

The magnetic field detectors 66 detect a surrounding magnetic field. The magnetic field detectors 66 are, for example, magneto impedance (MI) sensors. The drive powers of the magnetic field detectors 66 are, for example, supplied from the power source 21 through the drive circuit to the magnetic field detectors 66. Note that, magnetic field detectors 66 may also be Hall sensors, magneto resistive (MR) sensors, etc.

Figure 4:
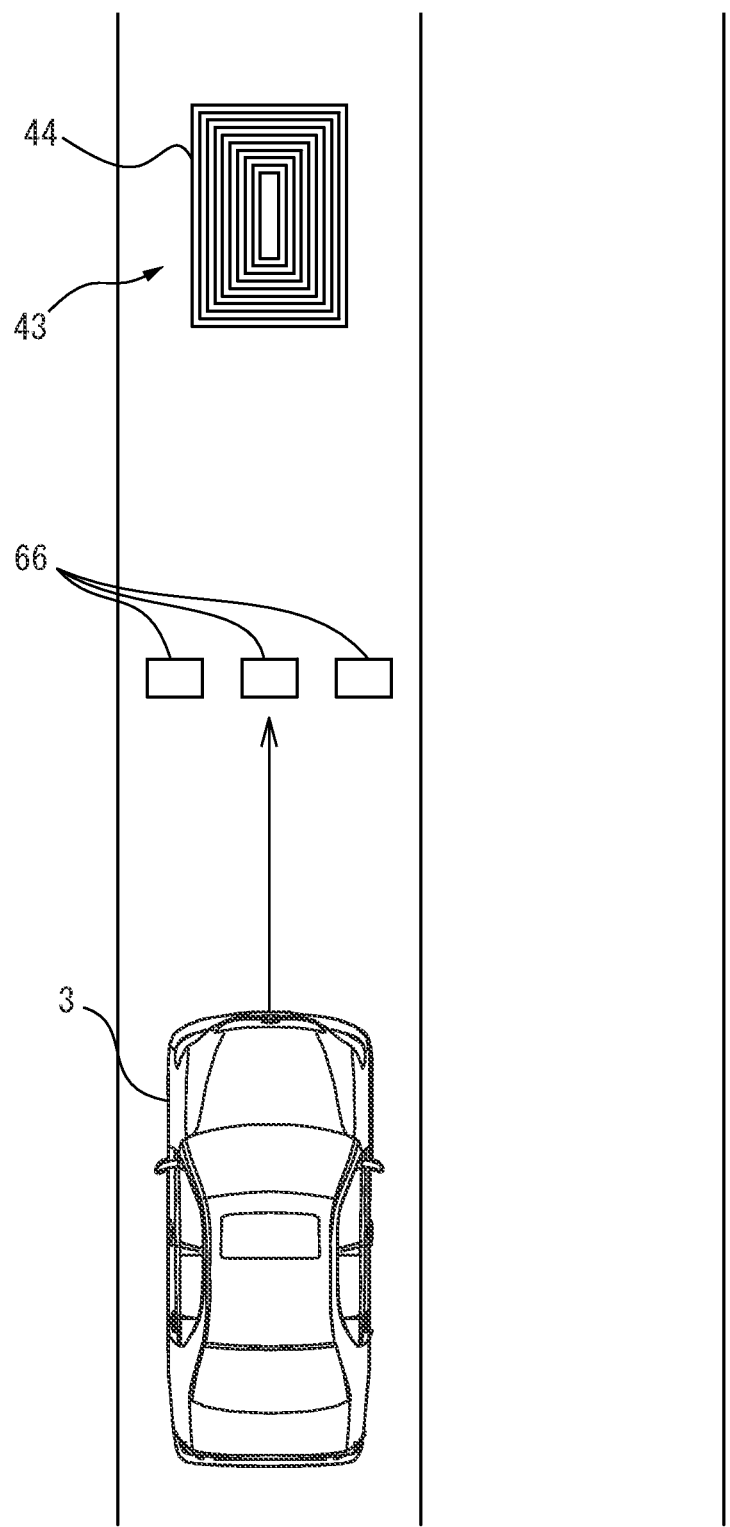
FIG. 4 is a view showing one example of an array of magnetic field detectors provided at a road.

FIG. 4 is a view showing one example of an array of magnetic field detectors 66 provided at the road 100. As shown in FIG. 4, the magnetic field detectors 66 are arranged further to the front than the power transmission side resonance circuit 43 of the power transmission apparatus 4 in the direction of advance of the vehicle 3, at the road at which the power transmission apparatus 4 is provided. Further, a plurality are arranged aligned in a direction perpendicular to the direction of advance of the vehicle 3. In particular, in the present embodiment, a plurality of magnetic field detectors 66 are arranged separate from each other in the direction perpendicular to the direction of advance of the vehicle 3, for example, at equal intervals in this direction. Further, the magnetic field detectors 66 are arranged in the ground (below the road surface) or on the road surface. If an alternating magnetic field for lateral deviation detection is generated from the vehicle 3 in the surroundings of the magnetic field detectors 66, the magnetic field detectors 66 detect the alternating magnetic field for position deviation detection.

The magnetic field detectors 66 are electrically connected to the controller 22, and the outputs of magnetic field detectors 66 are transmitted to the controller 22. Therefore, in the present embodiment, the controller 22 receives as input the outputs from the magnetic field detectors 66. Based on the outputs, the controller 22 detects the presence of any lateral deviation between the power reception side resonance circuit 51 and power transmission side resonance circuit 43, that is, the presence of any lateral deviation between the power transmission apparatus 4 and power reception apparatus 5.

In the thus configured lateral deviation detection device, when the vehicle 3 passes over the ground power supplying apparatus 2, the lateral deviation between the power reception side resonance circuit 51 and power transmission side resonance circuit 43 in the direction perpendicular to the direction of advance of the vehicle 3 is detected in accordance with the strength of the magnetic field detected by the plurality of aligned magnetic field detectors 66. When the lateral deviation between the power reception side resonance circuit 51 and power transmission side resonance circuit 43 is small, that is, when the vehicle 3 is running near the center of the lane, the strength of the magnetic field detected by the magnetic field detector 66 arranged at the center of the lane becomes the strongest. On the other hand, if the lateral deviation between the power reception side resonance circuit 51 and power transmission side resonance circuit 43 is large, that is, if the vehicle 3 is running off from the center of the lane, the strength of the magnetic field detected by a magnetic field detector 66 arranged away from the center of the lane becomes strongest. The lateral deviation detection device can, in this way, detect the presence of any lateral deviation between the power reception side resonance circuit 51 and power transmission side resonance circuit 43, that is, the presence of any lateral deviation between the power transmission apparatus 4 and power reception apparatus 5.

Note that, in the present embodiment, the vehicle 3 is provided with the alternating magnetic field generation circuit 61, and the ground power supplying apparatus 2 is provided with the magnetic field detectors 66. However, the ground power supplying apparatus 2 may be provided with the alternating magnetic field generation circuit 61, and the vehicle 3 may be provided with a magnetic field detector. In this case, the ECU 34 of the vehicle 3 detects the presence of any lateral deviation between the power reception side resonance circuit 51 and power transmission side resonance circuit 43, based on the output of the magnetic field detector provided at the vehicle 3.

Further, in the present embodiment, the lateral deviation detection device uses the magnetic fields to detect the presence of any lateral deviation. However, the lateral deviation detection device may also use something other than magnetic fields to detect lateral deviation. For example, it may be a sonar device using ultrasonic waves. Further, in the present embodiment, the lateral deviation detection device detects the presence of any lateral deviation, but it may also detect the amount of lateral deviation of the vehicle 3 from the center of the lane. In this case, the lateral deviation detection device judges that lateral deviation has occurred if the amount of lateral deviation detected by the lateral deviation detection device is greater than or equal to a predetermined reference value.

Configuration of Communication System

In the noncontact power supplying system 1 such as shown in FIG. 1, in order to transfer power by noncontact from the ground power supplying apparatus 2 to the vehicle 3, the ground power supplying apparatus 2 has to identify the vehicle 3 running over the power transmission apparatus 4, and needs the demanded supplied power and other information of the vehicle 3. For this reason, in order to transfer power by noncontact, it is necessary to transmit various vehicle information including vehicle identification information from the vehicle 3 to the ground power supplying apparatus 2. Further, the ground power supplying apparatus 2 has to receive the vehicle information transmitted from the vehicle 3.

The ground power supplying apparatus 2 has to receive vehicle identification information from only the vehicle 3 running near the ground power supplying apparatus 2, in order to identify the vehicle 3 running over the power transmission apparatus 4. On the other hand, if the speed of the vehicle 3 becomes faster, it is liable to become impossible to receive all of the vehicle information, including the demanded supplied power, from the vehicle 3 while the vehicle 3 is running near the ground power supplying apparatus 2.

Therefore, in the present embodiment, when the vehicle 3 is far away from the installation position of the ground power supplying apparatus 2 by a certain extent, the vehicle 3 transmits vehicle information tied to the vehicle identification information by wide area wireless communication from the vehicle 3 to the ground power supplying apparatus. Further, when the vehicle 3 approaches the installation position of the ground power supplying apparatus 2 or the vehicle 3 reaches the power transmission apparatus 4 of the ground power supplying apparatus 2, the vehicle 3 transmits the vehicle identification information by short range wireless communication from the vehicle 3 to the ground power supplying apparatus 2. That is, in the present embodiment, the vehicle information is transmitted by wide area wireless communication from the vehicle 3 to the ground power supplying apparatus 2 in advance, then the vehicle identification information is transmitted by short range wireless communication from the vehicle 3 to the ground power supplying apparatus 2.

In this regard, the vehicle identification information is information for identifying the vehicle 3, for example, is the vehicle ID. This vehicle identification information is stored in the memory 342 of the ECU 34 of the vehicle 3 in advance.

Further, the vehicle information is information of the vehicle 3 relating to power transfer, and includes the vehicle identification information. The vehicle information includes, for example, power (or electrical energy) demanded to be received from the ground power supplying apparatus 2, that is, the vehicle demand power (or the vehicle demand electrical energy). The vehicle demand power is calculated in the ECU 34 of the vehicle 3. Further, the vehicle information may also include information relating to the states of the vehicle, such as the states of the power reception apparatus 5 (connection state between the battery 32 and power reception apparatus 5), the state of charge SOC of the battery 32, the temperature of the battery 32, and the allowable charged power Win. In this case, the state of charge SOC of the battery 32 is calculated at the ECU 34 based on the value of the charge current and the value of the discharge current of the battery 32 detected by a vehicle side sensor 37 (battery current sensor). Further, the temperature of the battery 32 is detected by a vehicle side sensor 37 (battery temperature sensor). Further, the allowable charged power Win shows the maximum value of the charged power for not causing precipitation of metal lithium on the negative electrode surface of a lithium ion battery. This allowable charged power Win is calculated at the ECU 34 based on the charging history of the battery 32, the state of charge SOC of the battery 32, and the temperature of the battery 32.

In addition, the vehicle information includes the current position information of the vehicle 3. The current position information of the vehicle 3 is calculated at the ECU 34, based on the output of the GNSS receiver 35. Furthermore, the vehicle information may also include information relating to the power reception apparatus 5, such as the various parameters of the coil 44 and capacitor 45 of the power reception apparatus 5 (the outside diameter and the inside diameter of the coil 44, the number of turns of the coil 44, the electrostatic capacity of the capacitor 45, etc.), the height of the coil 44 from the ground surface, and the resonance frequency of the power reception side resonance circuit 51. Such vehicle information is stored in advance in the memory 342 of the ECU 34 of the vehicle 3. Furthermore, the vehicle information may include the user information required when the utilization fee is charged, such as, for example, authentication information identifying the settlement account of the user. Such vehicle information, for example, is registered in advance by the user using the input device of the vehicle 3, or is registered in advance by insertion of a card having the authentication information in a card reading device provided at the vehicle 3.

Figure 5:
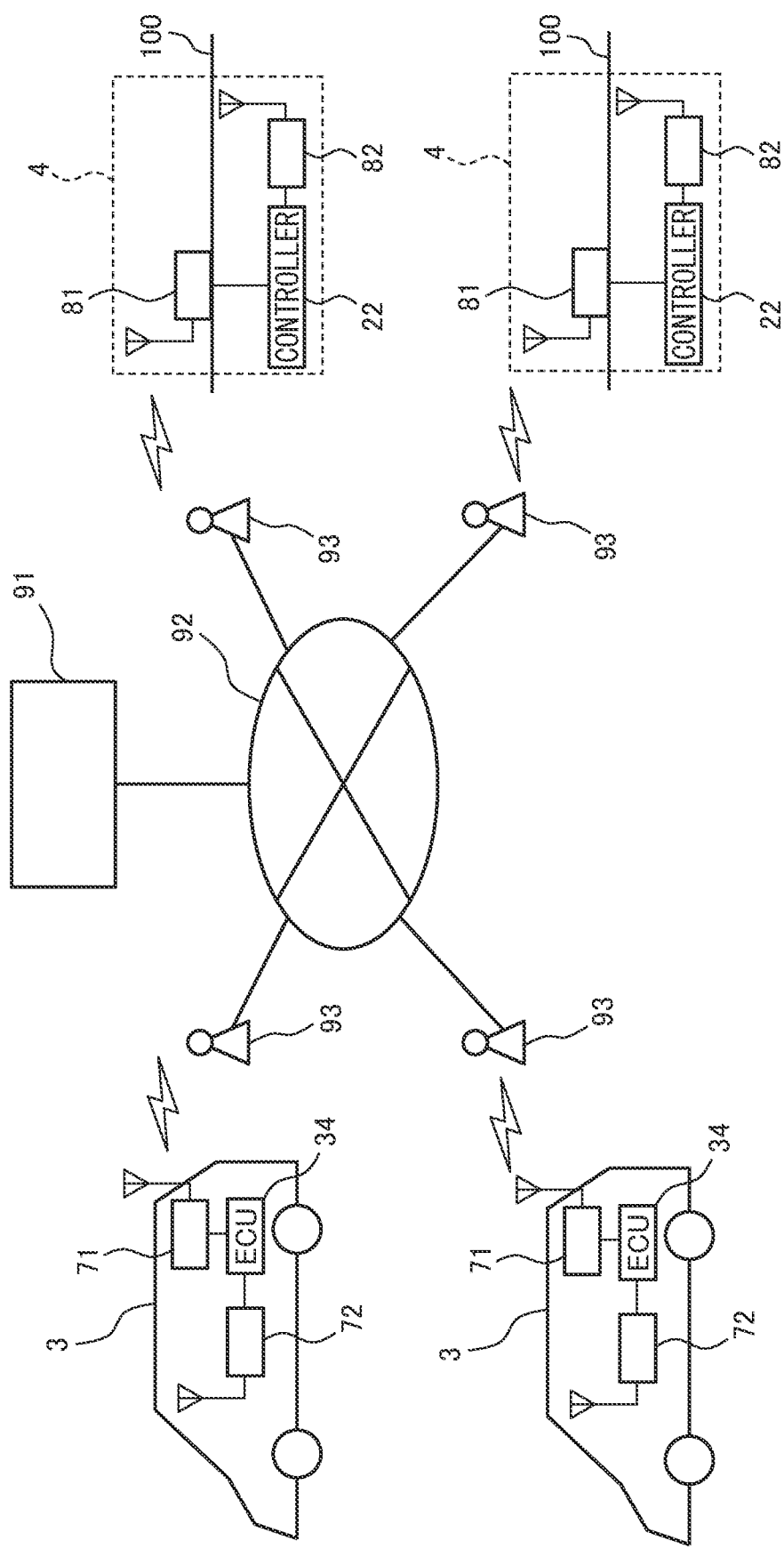
FIG. 5 is a schematic view of the configuration of a communication system used in the noncontact power supplying system.

FIG. 5 is a schematic view of the configuration of a communication system used in the noncontact power supplying system 1. As shown in FIGS. 3 and 5, the vehicle 3 has a vehicle side first communication device 71 for performing wide area wireless communication and a vehicle side second communication device 72 for performing short range wireless communication. These vehicle side first communication device 71 and vehicle side second communication device 72 are connected to the ECU 34 through an internal vehicle network. On the other hand, as shown in FIGS. 2 and 5, the ground power supplying apparatus 2 has a ground side first communication device 81 for performing wide area wireless communication and a ground side second communication device 82 for performing short range wireless communication. These ground side first communication device 81 and ground side second communication device 82 are electrically connected to the controller 22 by cables. In particular, in the present embodiment, the vehicle side first communication device 71 and the ground side first communication device 81 utilize wide area wireless communication to directly or indirectly communicate in one direction or two directions. Further, the vehicle side second communication device 72 and the ground side second communication device 82 utilize short range wireless communication to directly communicate in one direction or two directions.

Wide area wireless communication is communication with a longer communication distance compared with short range wireless communication, specifically for example communication with a communication distance of 10 meters to 10 kilometers. As wide area wireless communication, various wireless communication schemes with long communication distances can be used. For example, the wide area wireless communication includes communication based on the 3GPP, the IEEE formulated 4G, LTE, 5G, WiMAX, or any other communication standard. As explained above, in the present embodiment, wide area wireless communication is utilized to transmit vehicle information tied with vehicle identification information from the vehicle 3 to the ground power supplying apparatus 2.

In the present embodiment, the vehicle side first communication device 71 of the vehicle 3 and the ground side first communication device 81 of the ground power supplying apparatus 2 communicate through the server 91. Specifically, the server 91 is connected to a plurality of wireless base stations 93 through a communication network 92 comprised of optical communication circuits. The vehicle side first communication device 71 and the ground side first communication device 81 communicate with the wireless base stations 93 using wide area wireless communication. Therefore, the vehicle side first communication device 71 of the vehicle 3 and the ground side first communication device 81 of the ground power supplying apparatus 2 communicate using wide area wireless communication.

Note that, the ground side first communication device 81 may also be connected to the communication network 92 by cable. Therefore, the ground side first communication device 81 may be connected to the server 91 not wirelessly, but by wire. Further, the vehicle side first communication device 71 may also wirelessly communicate with the ground side first communication device 81 directly or through the communication network without going through the server 91. Therefore, the server 91 communicates with the vehicle 3 by wide area wireless communication, and communicates with the ground power supplying apparatus 2 wirelessly or by cable.

Figure 6:
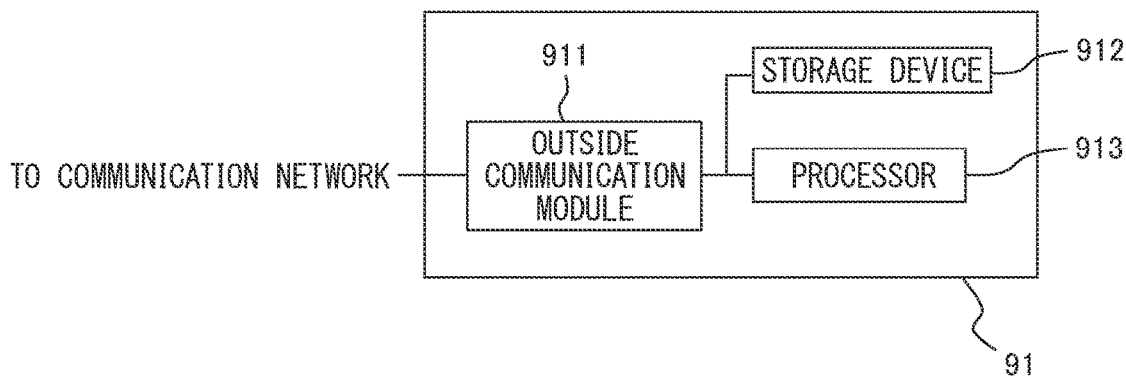
FIG. 6 is a view schematically showing a hardware configuration of a server.

FIG. 6 is a view schematically showing the hardware configuration of the server 91. The server 91, as shown in FIG. 6, is provided with an external communication module 911, storage device 912, and processor 913. Further, the server 91 may have input devices such as a keyboard and mouse, and an output device such as a display.

The external communication module 911 communicates with equipment outside the server 91 (ground power supplying apparatuses 2, vehicles 3, etc.) The external communication module 911 is provided with an interface circuit for connecting the server 91 with the communication network 92. The external communication module 911 is configured to be able to communicate through the communication network 92 and wireless base stations 93 with each of a plurality of vehicles 3 and ground power supplying apparatuses 2.

The storage device 912 has a volatile semiconductor memory (for example, RAM), nonvolatile semiconductor memory (for example, ROM), hard disk drive (HDD), solid state drive (SSD), or optical recording medium. The storage device 912 stores a computer program for the processor 913 to perform various processing, and various data used when various processing is performed by the processor 913. Further, in the present embodiment, the storage device 912 stores map information. The map information includes, in addition to information relating to the roads, installation position information of the ground power supplying apparatuses 2 and other information.

The processor 913 has one or more CPUs and their peripheral circuits. The processor 913 may further have a GPU or logic unit or arithmetic unit or other such processing circuit. The processor 913 performs various processing based on the computer program stored in the storage device 912 of the server 91.

Short range wireless communication indicates communication with a shorter communication distance compared with wide area wireless communication, and specifically, for example, indicates communication with a communication distance of less than 10 meters. As short range wireless communication, various short range wireless communication schemes with short communication distances can be used. For example, the short range wireless communication includes communication based on any communication standard formulated by the IEEE, ISO, IEC, etc. (for example, Bluetooth® and ZigBee®). Further, as the art for performing short range wireless communication, for example, RFID (Radio Frequency Identification), DSRC (Dedicated Short Range Communication) can be used. As explained above, in the present embodiment, the vehicle identification information is transmitted from the vehicle 3 to the ground power supplying apparatus 2, by using short range wireless communication.

In the present embodiment, the vehicle side second communication device 72 of the vehicle 3 and the ground side second communication device 82 of the ground power supplying apparatus 2 directly communicate by short range wireless communication. In the present embodiment, the vehicle side second communication device 72 transmits a signal including vehicle identification information, and the ground side second communication device 82 receives the signal including vehicle identification information.

The vehicle side second communication device 72 has an antenna for generating an electric wave or magnetic field, and a transmission circuit for supplying the antenna with electric power or current. The transmission circuit has an oscillation circuit, modulation circuit, and amplification circuit. The transmission circuit modulates a carrier wave generated at the oscillation circuit by the modulation circuit, in accordance with the vehicle identification information, and supplies the alternating current (alternating current power) generated by amplifying the modulated carrier wave by the amplification circuit, to the antenna. As a result, at the antenna, an electric wave or magnetic field is generated.

The ground side second communication device 82 has an antenna for receiving an electric wave or magnetic field, and a reception circuit for retrieving information from the electric wave or magnetic field received by the antenna. The reception circuit has an amplification circuit and demodulation circuit. The reception circuit amplifies the weak current generated by the electric wave or magnetic field received by the antenna by the amplification circuit, and demodulates the amplified signal by the demodulation circuit to thereby retrieve the information which was included in the signal (here, the vehicle identification information).

Note that, the communication between the vehicle side second communication device 72 and the ground side second communication device 82 may be performed by an electric wave, or may be performed by a magnetic field (that is, electromagnetic induction). In particular, in the case where the frequency of the carrier wave is low (for example, 50 Hz to 50 kHz), communication is performed by a magnetic field. In this case, a coil can be used as the antenna.

Further, the present embodiment is configured so that the vehicle side second communication device 72 transmits a signal, and the ground side second communication device 82 receives the signal. However, the vehicle side second communication device 72 may also have a reception circuit so as to be able to not only transmit, but also receive a signal. Further, the ground side second communication device 82 may also have a transmission circuit so as to be able to not only receive, but also send a signal.

Furthermore, in the present embodiment, the vehicle side second communication device 72 and the ground side second communication device 82 are provided at the vehicle 3 and ground power supplying apparatus 2 as devices separate from the lateral deviation detection device. However, the alternating magnetic field generation circuit 61 of the lateral deviation detection device may be used as the vehicle side second communication device 72, and a magnetic field detector 66 of the lateral deviation detection device may be used as the ground side second communication device 82. In this case, in the alternating magnetic field generation circuit 61, an alternating magnetic field is generated by the alternating current modulated in accordance with the vehicle identification information. In the magnetic field detector 66, the vehicle identification information is retrieved by demodulating the alternating current generated by the alternating magnetic field detected by the alternating magnetic field. Therefore, in this case, lateral deviation is detected based on the strength of the magnetic field detected by the magnetic field detector 66, and vehicle identification information is retrieved from the signal included in the magnetic field detected by the magnetic field detector 66.

General Flow of Power Supply

Next, the general flow of control when power is transferred by noncontact from the ground power supplying apparatus 2 to the vehicle 3 in the noncontact power supplying system 1 of the present embodiment, will be explained.

When power is transferred by noncontact from the ground power supplying apparatus 2 to the vehicle 3, first, the ECU 34 of the vehicle 3 makes the vehicle side first communication device 71 transmit vehicle information tied to the vehicle identification information to the ground side first communication device 81 of the ground power supplying apparatus 2. If the vehicle side first communication device 71 transmits vehicle information tied to the vehicle identification information, the ground side first communication device 81 of the ground power supplying apparatus 2 receives that vehicle information through wide area wireless communication. In particular, in the present embodiment, the ground side first communication device 81 of the ground power supplying apparatus 2 receives vehicle information of the vehicle 3 positioned within a predetermined nearby region in the surroundings of the ground power supplying apparatus 2.

As explained above, the memory 222 of the controller 22 of the ground power supplying apparatus 2 stores an identification information list of vehicle identification information of vehicles 3 which can be supplied with power by the ground power supplying apparatus. If the ground side first communication device 81 receives vehicle information tied with vehicle identification information from a vehicle 3, the controller 22 of the ground power supplying apparatus 2 registers the vehicle information tied with vehicle identification information in the identification information list. In particular, in the present embodiment, the ground side first communication device 81 receives vehicle information of a vehicle 3 positioned in the nearby region, therefore the vehicle identification information of the vehicle 3 positioned within the nearby region is registered in the identification information list.

If the vehicle identification information of even one vehicle 3 is registered in the identification information list, the controller 22 of the ground power supplying apparatus 2 makes the ground side second communication device 82 actuate so as to be able to communicate with the vehicle side second communication device 72, that is, so as to be able to receive vehicle identification information from the vehicle side second communication device 72 (the later explained, "reception standby state"). If the ground side second communication device 82 is actuated in this way, when a vehicle 3 emitting a signal including vehicle identification information from the vehicle side second communication device 72 approaches, the ground side second communication device 82 can receive the signal including the vehicle identification information which the vehicle side second communication device 72 emits.

Further, when the vehicle identification information is registered in the identification information list, the controller 22 of the ground power supplying apparatus 2 makes the ground side first communication device 81 send a notification of the vehicle identification information being registered in the identification information list, to the vehicle 3 identified by this vehicle identification information. Note that, if as explained above, the vehicle identification information is registered in the identification information list, the ground side second communication device 82 is actuated. Therefore, the notification of vehicle identification information being registered in the identification information list can be said to be a notification showing that the ground side second communication device 82 will be actuated or is being actuated so as to enable the ground power supplying apparatus 2 to receive the vehicle identification information by using short range wireless communication.

If a notification of vehicle identification information being registered in the identification information list is received by the vehicle side first communication device 71 from the ground side first communication device 81 through wide area wireless communication, the ECU 34 of the vehicle 3 supplies power to the vehicle side second communication device 72 to actuate it so as to enable a signal including vehicle identification information to be emitted to the ground side second communication device 82 of the ground power supplying apparatus 2, when the vehicle 3 approaches the ground power supplying apparatus 2, and, in addition, supplies power to the power reception apparatus 5 to actuate it so as to enable power to be received from the ground power supplying apparatus 2 while the vehicle 3 is running over the ground power supplying apparatus 2 (the later explained, "power reception active/signal emission state").

If the vehicle 3 approaches the ground power supplying apparatus 2 in a state where the vehicle side second communication device 72 is actuated and emits a signal including vehicle identification information and the ground side second communication device 82 is actuated so as to be able to communicate with the vehicle side second communication device 72, the ground side second communication device 82 receives the signal including vehicle identification information emitted from the vehicle side second communication device 72 of the vehicle 3.

If the ground side second communication device 82 receives vehicle identification information, the controller 22 of the ground power supplying apparatus 2 compares the received vehicle identification information against the identification information list. Further, when the received vehicle identification information has been registered in the identification information list, power is supplied to the power transmission side resonance circuit 43 to enable power to be transmitted to the vehicle 3 while the vehicle 3 is running over the ground power supplying apparatus 2 (the later explained, "power transmission active state"). If the vehicle 3 moves in this way in a state where the power transmission side resonance circuit 43 of the ground power supplying apparatus 2 is supplied with power and in a state where the power reception apparatus 5 of the vehicle 3 is actuated, when the power reception side resonance circuit 51 of the vehicle 3 is positioned over the power transmission side resonance circuit 43 of the ground power supplying apparatus 2, power is supplied from the ground power supplying apparatus 2 to the vehicle 3. If, after that, the vehicle 3 moves and the power reception apparatus 5 of the vehicle 3 moves away from the power transmission apparatus 4 of the ground power supplying apparatus 2, the supply of power is ended.

As explained above, in the present embodiment, when receiving power from the ground power supplying apparatus 2, the ECU 34 of the vehicle 3 makes the vehicle side first communication device 71 transmit the vehicle information tied with the vehicle identification information to the ground side first communication device 81 of the ground power supplying apparatus 2. In addition, after the vehicle side first communication device 71 transmits the vehicle information, the ECU 34 makes the vehicle side second communication device 72 transmit the vehicle identification information to the ground side second communication device 82 of the ground power supplying apparatus 2. As a result, the ground power supplying apparatus 2 has to receive only vehicle identification information through short range wireless communication while the vehicle 3 is running near the ground power supplying apparatus 2, and no longer has to receive other vehicle information through short range wireless communication. For this reason, even if the speed of the vehicle 3 is somewhat fast, it is possible to transmit the required information to the ground power supplying apparatus 2.

Communication Utilizing Wide Area Wireless Communication

Figure 7:
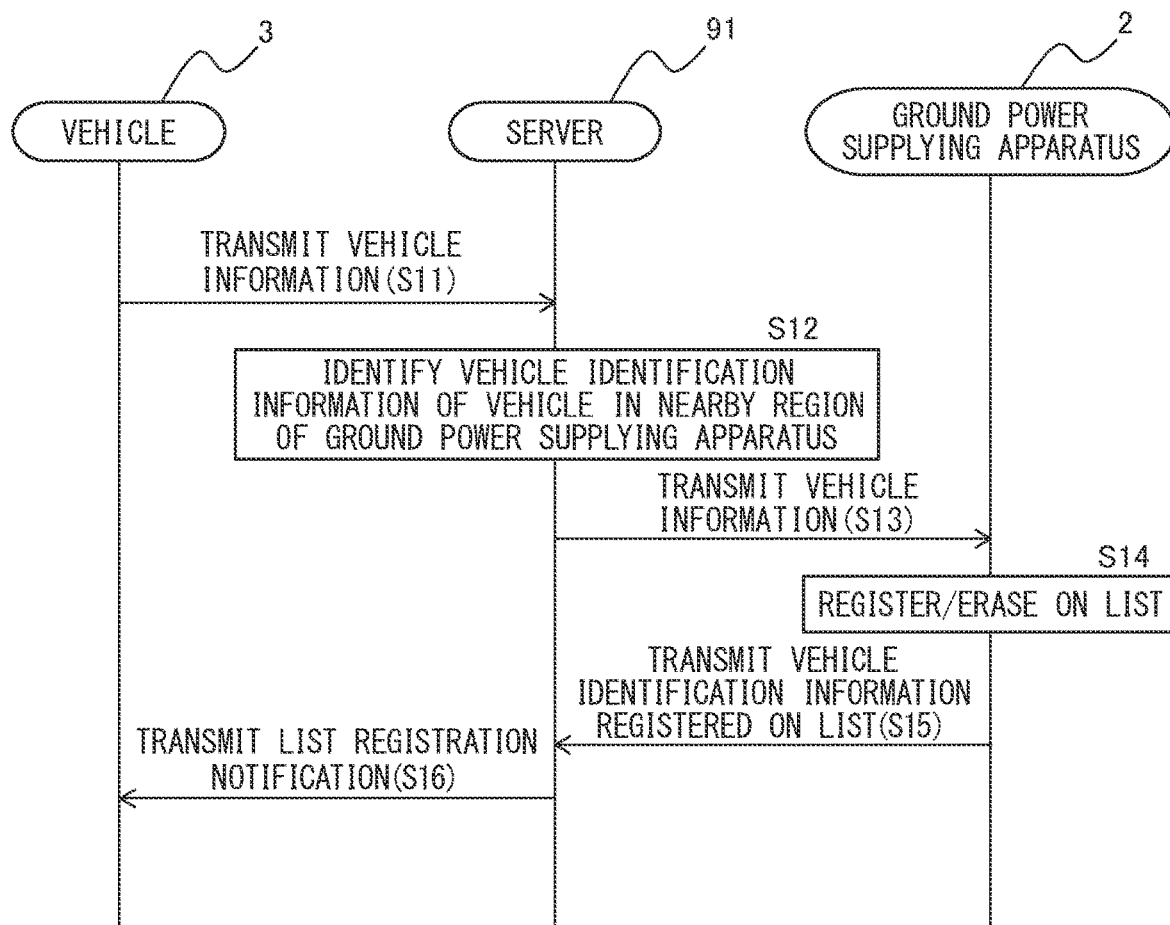
FIG. 7 is an operation sequence diagram relating to a vehicle, a server, and a ground power supplying apparatus utilizing wide area wireless communication.

Next, referring to FIGS. 7 to 10, communication among the vehicle 3, server 91, and ground power supplying apparatus 2 utilizing wide area wireless communication and the operation of the vehicle 3, server 91, and ground power supplying apparatus 2 relating to this communication will be explained. FIG. 7 is an operation sequence diagram relating to communication among the vehicle 3, server 91, and ground power supplying apparatus 2 utilizing wide area wireless communication.

As shown in FIG. 7, the ECU 34 of the vehicle 3 acquires the vehicle information, and makes the vehicle side first communication device 71 transmit the acquired vehicle information to the server 91 through wide area wireless communication (step S11). As explained above, the vehicle information includes the vehicle identification information, various parameters of the power reception apparatus 5, current position information of the vehicle 3, the vehicle demand power, and other information of the vehicle 3 relating to power transfer. The ECU 34 acquires the vehicle identification information and various parameters of the power reception apparatus 5 from the memory 342, and acquires the current position information of the vehicle 3 from the GNSS receiver 35. Further, the ECU 34 calculates the vehicle demand power based on the various states of the vehicle 3. Specifically, the ECU 34 sets the vehicle demand power smaller as the state of charge SOC of the battery 32 is higher, and sets the vehicle demand power smaller as the temperature of the battery 32 is higher.

Further, the ECU 34 of the vehicle 3 makes the vehicle side first communication device 71 transmit the vehicle information every predetermined time interval. This time interval is always constant. Alternatively, this time interval may change in accordance with the situation. In this case, specifically, this time interval is, for example, set to become shorter as the distance from the current position of the vehicle 3 acquired from the GNSS receiver 35 to the installation position of the ground power supplying apparatus 2 stored in the storage device 36 becomes shorter.

If receiving vehicle information from a plurality of vehicles 3 able to communicate with the server 91, the server 91 identifies the vehicle identification information of the vehicles 3 positioned within the nearby regions of the ground power supplying apparatuses 2, based on the current position information of the vehicles 3 included in the vehicle information (step S12). Specifically, the server 91 identifies the vehicle identification information of the vehicles 3 positioned at predetermined nearby regions at the surroundings of the ground power supplying apparatuses 2, based on the current position information of the vehicles 3 included in the vehicle information received from the vehicles 3 and the installation position information of the ground power supplying apparatuses 2 stored in the storage device 912 of the server 91.

The above "nearby region" is, for example, set as a region within a predetermined range (for example, 500 m) from an intended ground power supplying apparatus 2. Alternatively, the above "nearby region" may be set as a region within a predetermined first distance from an intended ground power supplying apparatus 2 for the lane on which the vehicle 3 heading toward the ground power supplying apparatus 2 is running, and may be set within a predetermined second distance shorter than the first distance from the intended ground power supplying apparatus 2 for the lane on which the vehicle 3 heading from the ground power supplying apparatus 2 is running.

Further, the above "nearby region" may be a region larger as the speed of the vehicle 3 is faster. Specifically, for example, if a certain region is set as a "predetermined region" for a vehicle 3 with a speed of less than or equal to a predetermined reference speed, a region including the above certain region and larger than the above certain region is set as a "nearby region" for a vehicle with a speed faster than the predetermined reference speed. In this case, the faster the speed of the vehicle 3 becomes, the longer the distance from the current position of the vehicle 3 to the installation position of the ground power supplying apparatus 2 when vehicle information is transmitted by the vehicle side first communication device 71 through the server 91 to the ground power supplying apparatus 2.

The server 91 identifies the vehicle identification information of the vehicles 3 positioned within the nearby regions of the ground power supplying apparatuses 2, every predetermined time interval. This time interval is preferably the same extent as the shortest time interval at which the ECUs 34 of the vehicles 3 transmit vehicle information to the server 91.

If identifying the vehicle identification information of the vehicles 3 positioned within the nearby regions of the ground power supplying apparatuses 2, the server 91 transmits the vehicle information of the vehicles 3 tied to the identified vehicle identification information to the ground power supplying apparatuses 2 through the communication network 92 (step S13). Therefore, vehicle information of the vehicles 3 positioned within the nearby regions at the surroundings of the ground power supplying apparatuses 2 is transmitted to the ground power supplying apparatuses 2 from the server 91. At this time, the transmitted vehicle information includes, in addition to the vehicle identification information, the information required for supply of power to the vehicles 3 at the ground power supplying apparatuses 2.

If the ground side first communication device 81 of a ground power supplying apparatus 2 receives vehicle information from the server 91, the controller 22 of the ground power supplying apparatus 2 registers and erases vehicle identification information on the identification information list, based on the vehicle identification information tied to the received vehicle information (step S14). Specifically, in the present embodiment, the controller 22 registers and erases vehicle identification information on the identification information list so that the vehicle identification information tied to the received vehicle information is registered in the identification information list without exaggeration and without omission.

If the controller 22 of the ground power supplying apparatus 2 registers and erases the vehicle identification information on the identification information list, it makes the ground side first communication device 81 transmit the vehicle identification information registered at the identification information list to the server 91 through the communication network 92 (step S15). The controller 22 transmits the vehicle identification information to the server 91 every predetermined time interval. At this time, the controller 22 transmits all of the vehicle identification information registered in the identification information list. Note that, the controller 22 may also transmit only vehicle identification information newly registered at the identification information list and vehicle identification information erased from the identification information list. In this case, the controller 22 may also transmit the vehicle identification information to the server 91 not every predetermined time interval, but every time when the vehicle identification information described at the identification information list is changed.

If receiving vehicle identification information registered at the identification information list from a ground power supplying apparatus 2, the server 91 transmits, to the vehicle 3 corresponding to the vehicle identification information registered at the identification information list, a notification to the effect of vehicle identification information being registered at the identification information list (below, referred to as a "list registration notification") (step S16). In the present embodiment, a list registration notification is transmitted every certain time interval. The list registration notification may include the identification information or installation position information of the ground power supplying apparatus 2 of which vehicle identification information is registered on the identification information list. As a result, when vehicle identification information of the vehicle 3 is registered on the identification information list of any ground power supplying apparatus 2, a list registration notification is transmitted to that vehicle 3. On the other hand, when vehicle identification information of the vehicle 3 is not registered on the identification information list of any ground power supplying apparatus 2, list registration notification is not transmitted to that vehicle 3. For this reason, each vehicle 3 can constantly grasp whether its own vehicle identification information has been registered in any ground power supplying apparatus 2. Note that, when vehicle receives from the server 91 only newly registered or erased vehicle identification information, the server transmits a notification to the effect that vehicle identification information has been registered at or erased from the identification information list, to the vehicle 3 corresponding to that vehicle identification information.

In this regard, in the operation sequence diagram shown in FIG. 7, registration/erasure of vehicle identification information on the identification information list of a ground power supplying apparatus 2 is determined, based on only whether a vehicle 3 is positioned at a nearby region of the ground power supplying apparatus 2. Therefore, basically, when the vehicle 3 departs outside of the nearby region of the ground power supplying apparatus 2, the vehicle identification information of the vehicle 3 is erased from that identification information list of the ground power supplying apparatus 2. However, vehicle identification information may also be registered or erased on the identification information list of the ground power supplying apparatus 2, based on other factors. Specifically, for example, if power finishes being supplied to a vehicle 3 at a certain ground power supplying apparatus 2, that vehicle identification information of the vehicle 3 may be erased from the identification information list of that ground power supplying apparatus 2. Further, if erasure of vehicle identification information of a vehicle 3 from the identification information list of a specific ground power supplying apparatus 2 has been requested from the vehicle 3, the vehicle identification information of that vehicle 3 may be erased from the identification information list of that ground power supplying apparatus 2.

Figure 8:
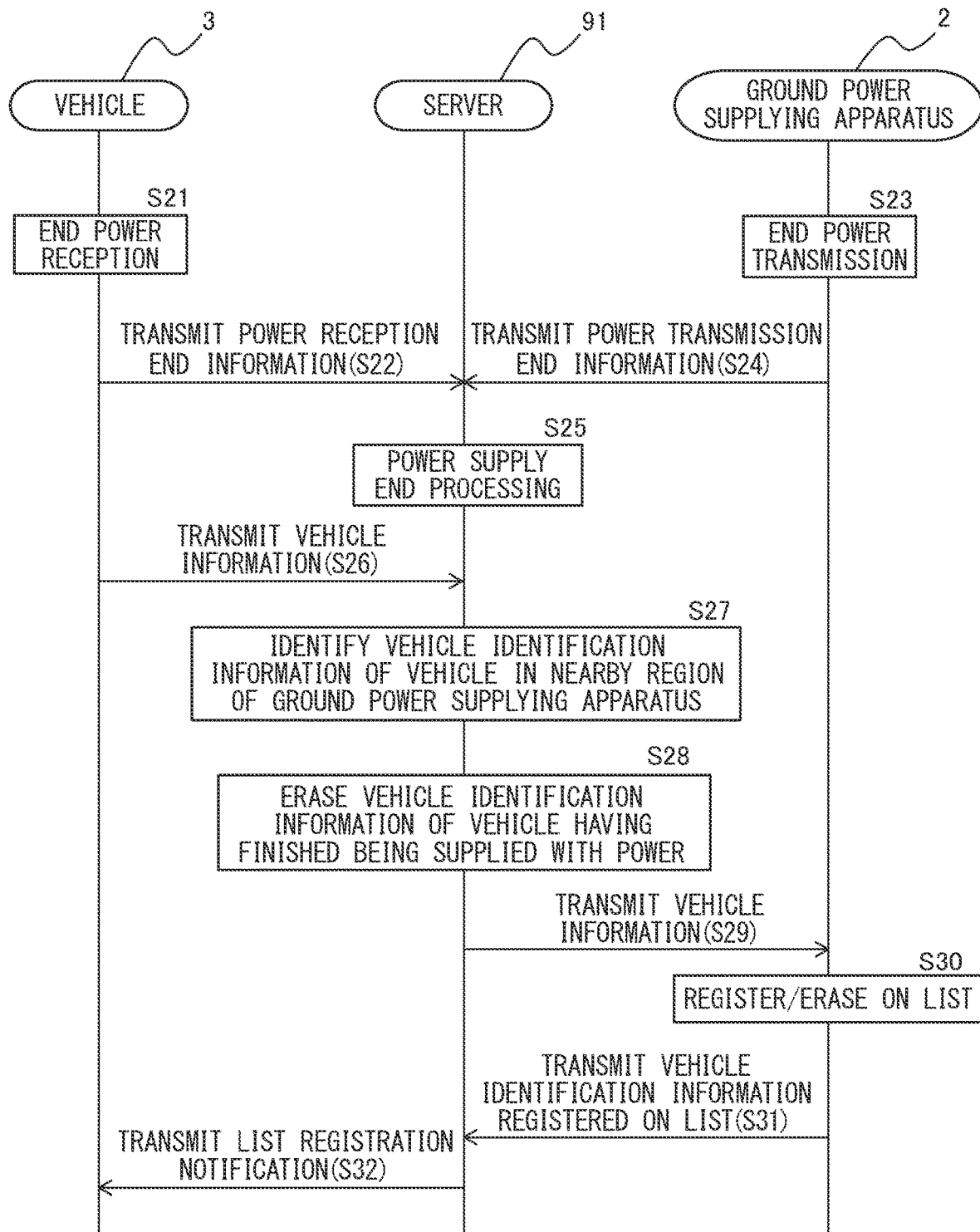
FIG. 8 is an operation sequence diagram, similar to FIG. 7, relating to a vehicle, a server, and a ground power supplying apparatus utilizing wide area wireless communication.

FIG. 8 is an operation sequence diagram, similar to FIG. 7, relating to communication among a vehicle 3, server 91, and ground power supplying apparatus 2 utilizing wide area wireless communication. In particular, FIG. 8 shows the operation after power has finished being supplied from the ground power supplying apparatus 2 to the vehicle 3.

If power finishes being received by the vehicle 3 from the ground power supplying apparatus 2 (step S21), the ECU 34 of the vehicle 3 makes the vehicle side first communication device 71 transmit power reception end information to the server 91 (step S22). The power reception end information includes information relating to power reception from the ground power supplying apparatus 2. Specifically, the power reception end information includes, for example, vehicle identification information of the vehicle 3, power received from the ground power supplying apparatus 2, power reception efficiency, and result of detection of abnormalities relating to power reception of the vehicle 3 during power reception and before and after power reception, etc. Further, the power reception end information may additionally include the power reception period (for example, start time and end time), electrical energy received from the ground power supplying apparatus 2, etc. The values of various parameters included in the power reception end information are calculated at the ECU 34, based on the outputs of the vehicle side sensors 37 or the like during power reception from the ground power supplying apparatus 2.

Further, if power finishes being transmitted from the ground power supplying apparatus 2 to the vehicle 3 (step S23), the controller 22 of the ground power supplying apparatus 2 makes the ground side first communication device 81 transmit the power transmission end information to the server 91 (step S24). The power transmission end information includes information relating to power transmission to the vehicle 3. Specifically, the power transmission end information, for example, includes identification information of the ground power supplying apparatus 2, vehicle identification information of the vehicle 3, transmitted power to the vehicle 3, power transmission efficiency, and results of detection of abnormalities relating to power transmission to the vehicle 3 during power transmission and before and after power transmission, etc. Further, the power transmission end information may additionally include the power transmission period (for example, start time and end time), electrical energy transmitted to the vehicle 3, etc. The values of various parameters included in the power transmission end information are calculated by the controller 22, based on the outputs of the ground side sensors 23 or the like during power transmission to the vehicle 3.

If receiving power reception end information and power transmission end information for the same vehicle 3 for the same period respectively from the vehicle 3 and ground power supplying apparatus 2, the server 91 performs power supply end processing for the corresponding power supply from the ground power supplying apparatus 2 to the vehicle 3 (step S25). In the power supply end processing, for example, the electrical energy supplied from the ground power supplying apparatus 2 to the vehicle 3 is calculated based on the power reception end information and the power transmission end information, charging processing to the user of the vehicle 3 is performed based on the calculated electrical energy supplied, abnormalities of the power transmission apparatus 4 of the ground power supplying apparatus 2 and the power reception apparatus 5 of the vehicle 3 are diagnosed. The electrical energy supplied from the ground power supplying apparatus 2 to the vehicle 3 is, for example, calculated based on changes along with time in the power received from the ground power supplying apparatus 2 and power transmitted to the vehicle 3. Further, in the charging processing to the user of the vehicle 3, for example, a fee corresponding to the electrical energy supplied from the ground power supplying apparatus 2 to the vehicle 3 is changed to the settlement account of the user. Further, in diagnosis of the power transmission apparatus 4 and power reception apparatus 5, for example, it is diagnosed that there is an abnormality in the power transmission apparatus 4 or power reception apparatus 5 if there is a large difference between the received power included in the power reception end information and the transmitted power included in the power transmission end information.

Note that, power supply end processing is performed each time power finishes being supplied to a vehicle 3 at one ground power supplying apparatus 2, therefore each time a power reception apparatus 5 of a vehicle 3 passes over one power transmission apparatus 4. For this reason, in the power supply end processing, the electrical energy supplied or the like is calculated for supply of power to a vehicle 3 in one ground power supplying apparatus 2. However, power supply end processing may also be performed each time power finishes being supplied to a vehicle 3 in a plurality of ground power supplying apparatuses 2, therefore each time a power reception apparatus 5 of a vehicle 3 passes over a plurality of power transmission apparatuses 4. In this case, in power supply end processing, the total electrical energy supplied to a vehicle 3 or the like is calculated at the plurality of ground power supplying apparatuses 2.

Regardless of the power supply end processing, similarly to step S11 of FIG. 7. vehicle information is transmitted from the vehicles 3 to the server 91 (step S26) and, similarly to step S12 of FIG. 7, the server 91 identifies the vehicle identification information of the vehicles 3 positioned within the nearby regions of the ground power supplying apparatuses 2, based on the vehicle information (step S27). Further, if power supply end processing to a certain vehicle 3 has already been performed at a certain ground power supplying apparatus 2, the server 91 erases the vehicle identification information of the vehicle 3 for which power supply end processing has already been performed, from the vehicle identification information of the vehicle 3 in the nearby region of this ground power supplying apparatus 2 identified at step S27 (step S28).

After that, the server 91 transmits the vehicle information tied to the vehicle identification information not erased at step S28 in the vehicle identification information of the vehicles 3 identified as being positioned within the nearby regions of the ground power supplying apparatuses 2, to the ground power supplying apparatuses 2 (step S29). If the vehicle information is transmitted to the ground power supplying apparatuses 2, the controllers 22 of the ground power supplying apparatuses 2, similarly to step S14 of FIG. 7, register or erase vehicle identification information to or from the identification information lists (step S30). After that, similarly to step S15 of FIG. 7, vehicle identification information registered at the identification information lists is transmitted (step S31), and, similarly to step S16 of FIG. 7, list registration notifications are transmitted (step S32).

Further, if the server 91 receives from a vehicle 3 a request for erasure of vehicle identification information of the vehicle 3 from the identification information list of a specific ground power supplying apparatus 2 (for example, "identification information erasure request" or the like, which is later explained referring to FIG. 14), similarly to step S28, the vehicle identification information of the vehicle 3 may be erased from the vehicle identification information of the vehicle 3 in the nearby region of that ground power supplying apparatus 2.

As a result, if the processing shown in FIG. 8 is performed, in the identification information list, vehicle identification information of the vehicles 3 positioned within the nearby regions of the ground power supplying apparatuses 2 and not finished being supplied with power from the ground power supplying apparatuses 2 and not requesting erasure of identification information is registered. Further, a vehicle 3 receives list registration notification when the vehicle identification information of the vehicle 3 is registered in the identification information list of any ground power supplying apparatus 2.

Figure 9:
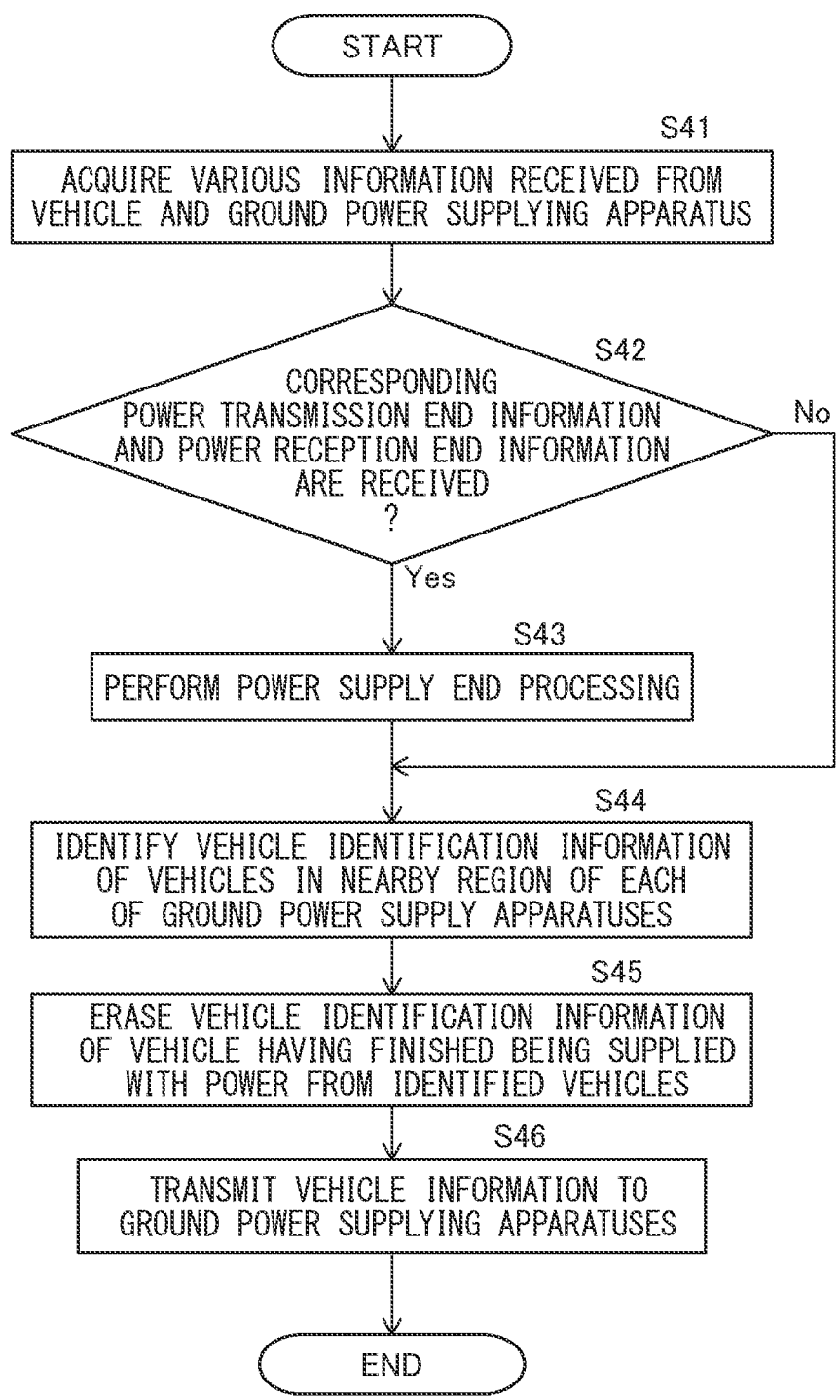
FIG. 9 is a flow chart showing a flow of processing relating to communication utilizing wide area wireless communication, in the server.

FIG. 9 is a flow chart showing a flow of processing relating to communication utilizing wide area wireless communication, at the server 91. The processing shown in FIG. 9 is performed at the processor 913 of the server 91 every constant time interval.

First, the processor 913 of the server 91 acquires various information received from vehicles 3 and ground power supplying apparatuses 2 (step S41). The various information includes vehicle information and power reception end information tied to the vehicle identification information, received from the vehicles 3 and stored in the storage device 912 of the server 91. Further, the various information includes power transmission end information tied to the vehicle identification information, received from the ground power supplying apparatuses 2 and stored in the storage device 912 of the server 91.

Next, the processor 913 of the server 91 judges if it has received power reception end information and power transmission end information tied to the same vehicle identification information from a vehicle 3 and ground power supplying apparatus 2 (step S42). If at step S42 it is judged that corresponding power reception end information and power transmission end information have been received, the processor 913 of the server 91 performs the above-mentioned power supply end processing (step S43). On the other hand, if at step S42 it is judged that corresponding power reception end information and power transmission end information have not been received, step S43 is skipped.

Next, the processor 913 of the server 91 identifies the vehicle identification information of the vehicles 3 positioned within the nearby regions of the ground power supplying apparatuses 2, based on vehicle information of the vehicles 3 (in particular, current position information), installation position information of the ground power supplying apparatuses 2 and the like, acquired at step S41 (step S44). The nearby regions of the ground power supplying apparatuses 2 are, for example, stored in advance in the storage device 912 of the server 91.

Next, if power supply end processing to a certain vehicle 3 has already been performed in a certain ground power supplying apparatus 2, the processor 913 of the server 91 erases the vehicle identification information of the vehicle 3 for which power supply end processing has already been performed, from the vehicle identification information of the vehicles 3 positioned within the nearby region of the ground power supplying apparatus 2 identified at step S44 (step S45). After that, the processor 913 of the server 91 transmits, to the ground power supplying apparatuses 2, the vehicle information tied to the vehicle identification information not erased at step S45 in the vehicle identification information of the vehicles 3 identified as being positioned within the nearby regions of the ground power supplying apparatuses 2 (step S46).

Figure 10:
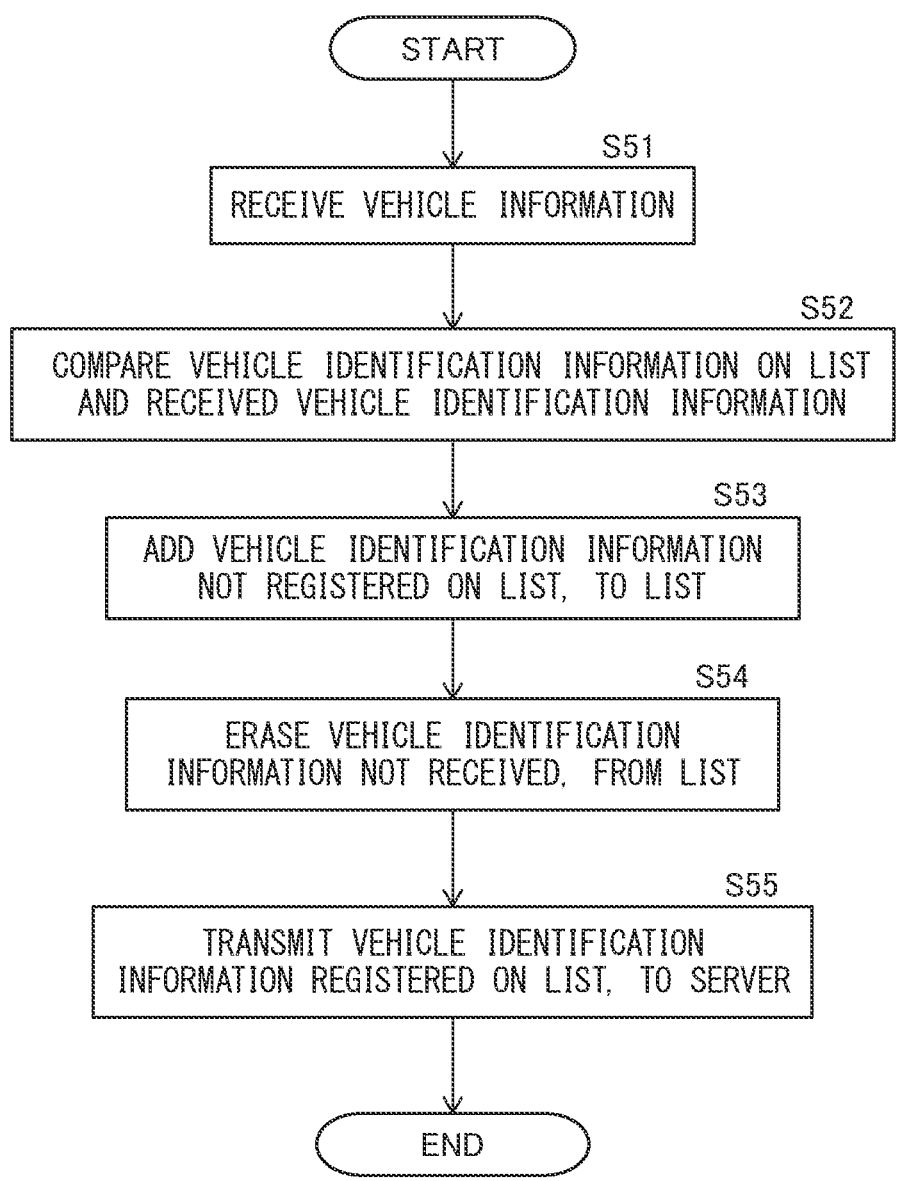
FIG. 10 is a flow chart showing a flow of processing relating to communication utilizing wide area wireless communication, in the ground power supplying apparatus.

FIG. 10 is a flow chart showing a flow of processing relating to communication utilizing wide area wireless communication at a ground power supplying apparatus 2. The processing shown in FIG. 10 is performed at the processor 223 of the controller 22 of the ground power supplying apparatus 2 every time the ground side first communication device 81 of the ground power supplying apparatus 2 receives vehicle information tied to the vehicle identification information from the server 91.

If the ground side first communication device 81 receives vehicle information tied to the vehicle identification information of a vehicle 3 positioned within the nearby region of the ground power supplying apparatus 2 (step S51), the processor 223 compares the vehicle identification information included in the vehicle information and the vehicle identification information in the identification information list stored in the memory 342 (step S52).

After that, as a result of comparison of the vehicle identification information at step S52, the processor 223 newly registers, in the identification information list, the vehicle identification information not yet registered in the identification information list in the vehicle identification information included in the received vehicle information (step S53). In addition, the processor 223 erases, from the identification information list, the vehicle identification information not included in the vehicle identification information included in the vehicle information received from the server 91, in the vehicle identification information which had been registered in the identification information list (step S54). As a result, in the identification information list, the vehicle identification information of the vehicles 3 positioned within the nearby regions of the ground power supplying apparatuses 2 is constantly registered. After that, the processor 223 makes the ground side first communication device 81 transmit the vehicle identification information registered in the identification information list to the server 91 through the communication network 92 (step S55)

States and Operations of Vehicle and Ground Power Supplying Apparatus Relating to Power Supply Next, referring to FIGS. 11 to 15, the states and operations of a vehicle 3 and ground power supplying apparatus 2 relating to power supply from the ground power supplying apparatus 2 to the vehicle 3 will be explained.

Figure 11:
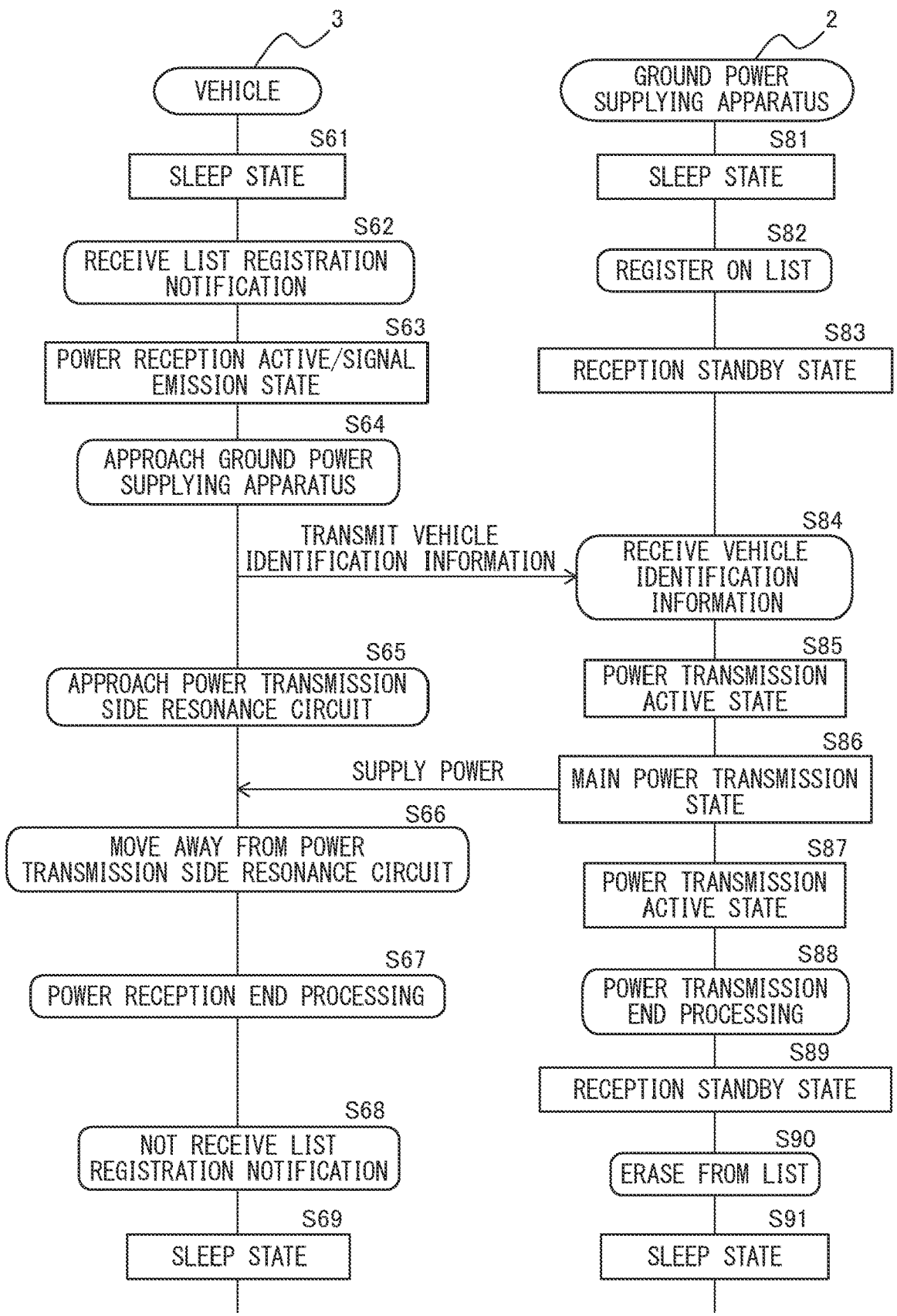
FIG. 11 is a view schematically showing transitions in the operations and states of the vehicle and ground power supplying apparatus, when the vehicle approaches the ground power supplying apparatus and is supplied with power.

First, referring to FIG. 11, the general transitions in operations and states of the vehicle 3 and ground power supplying apparatus 2, when power is supplied from the ground power supplying apparatus 2 to the vehicle 3, will be explained. FIG. 11 is a view schematically showing the transitions in operations and states of the vehicle 3 and ground power supplying apparatus 2 when the vehicle 3 approaches the ground power supplying apparatus 2 and is supplied with power. Note that, in the example shown in FIG. 11, to simplify the explanation, the transitions are shown in the case where there is only one vehicle 3 and there is only one ground power supplying apparatus 2. Further, in FIG. 11, the sharp corner rectangles show states of the vehicle 3 or states of the ground power supplying apparatus 2, while the rounded corner rectangles show the operations of the vehicle 3 or ground power supplying apparatus 2.

In the example shown in FIG. 11, in the initial state, the vehicle 3 is considerably away from the ground power supplying apparatus 2, and is positioned at the outside of the nearby region of the ground power supplying apparatus 2. For this reason, the vehicle identification information of the vehicle 3 is not registered in the identification information list of the ground power supplying apparatus 2. Therefore, a list registration notification is not transmitted to the vehicle 3 either.

In this state, power will not be supplied from the ground power supplying apparatus 2 to the vehicle 3 for a while. Therefore, the vehicle 3 is in a "sleep state" where only standby power is supplied to equipment related to power reception and power is not supplied to the vehicle side second communication device 72 (step S61). Further, the ground power supplying apparatus 2 is also set to a "sleep state" where only standby power is supplied and power is not supplied to the ground side second communication device 82 (step S81).

After that, if the vehicle 3 enters inside the nearby region of the ground power supplying apparatus 2, as explained above, vehicle identification information of the vehicle 3 is registered in the identification information list of the ground power supplying apparatus 2 (step S82). Further, along with this, the vehicle 3 receives a list registration notification notifying the fact of the vehicle identification information being registered in the identification information list of the ground power supplying apparatus 2 (step S62).

If the vehicle identification information is registered in the identification information list of the ground power supplying apparatus 2, the ground power supplying apparatus 2 is in a "reception standby state" where power is supplied to the ground side second communication device 82 (step S83). At the reception standby state, if a signal is emitted from the vehicle side second communication device 72 at a close distance from the ground side second communication device 82, the ground side second communication device 82 can receive this signal. Further, if the vehicle 3 receives a list registration notification, the vehicle 3 is in a "power reception active/signal emission state" where power for actuating is supplied to equipment relating to power reception by the vehicle 3 and power is supplied to the vehicle side second communication device 72 so that a signal including vehicle identification information of the vehicle 3 is emitted (step S63). In the power reception active/signal emission state, if the power reception side resonance circuit 51 of the power reception apparatus 5 of the vehicle 3 is positioned above the power transmission side resonance circuit 43 of the power transmission apparatus 4 of the ground power supplying apparatus 2, the power reception side resonance circuit 51 can receive power from the power transmission side resonance circuit 43.

After that, if the vehicle 3 approaches the ground power supplying apparatus 2 and it becomes possible for the ground side second communication device 82 to receive a signal emitted from the vehicle side second communication device 72 (step S64), a signal including vehicle identification information is transmitted from the vehicle side second communication device 72 to the ground side second communication device 82, and the ground side second communication device 82 receives this signal transmitted from the vehicle side second communication device 72 (step S84).

The range of communication is short in short range wireless communication, therefore the fact of the ground side second communication device 82 receiving the signal emitted from the vehicle side second communication device 72 means the vehicle 3 identified with the received vehicle identification information reached near the ground power supplying apparatus 2. Therefore, in the present embodiment, if the ground side second communication device 82 receives a signal including vehicle identification information, the ground power supplying apparatus 2 is in the "power transmission active state" (step S85). In the power transmission active state, weak power is supplied to the power transmission side resonance circuit 43 of the ground power supplying apparatus 2.

After that, if, in the state where the vehicle 3 is in the power reception active state and the ground power supplying apparatus 2 is in the power transmission active state, the power reception side resonance circuit 51 of the vehicle 3 approaches the power transmission side resonance circuit 43 of the ground power supplying apparatus 2 and is positioned over the power transmission side resonance circuit 43 (step S65), magnetic field resonant coupling is generated between the power transmission side resonance circuit 43 and power reception side resonance circuit 51, and the current flowing in the power transmission side resonance circuit 43 of the ground power supplying apparatus 2 increases. If the current flowing in the power transmission side resonance circuit 43 increases in this way, the ground power supplying apparatus 2 is in a "main power transmission state" where a large power is supplied to the power transmission side resonance circuit 43 (step S86). At this time, strong magnetic field resonant coupling is generated between the power transmission side resonance circuit 43 and power reception side resonance circuit 51, and accordingly power is supplied from the power transmission side resonance circuit 43 to the power reception side resonance circuit 51, and accordingly power is supplied from the ground power supplying apparatus 2 to the vehicle 3.

After that, if the vehicle 3 moves and the power reception side resonance circuit 51 of the vehicle 3 moves away from the power transmission side resonance circuit 43 of the ground power supplying apparatus 2 (step S66), the magnetic field resonant coupling generated between the power transmission side resonance circuit 43 and power reception side resonance circuit 51 becomes weaker, and the current flowing in the power transmission side resonance circuit 43 of the ground power supplying apparatus 2 falls. If the current flowing in the power transmission side resonance circuit 43 falls in this way, the power supplied to the power transmission side resonance circuit 43 falls, and the ground power supplying apparatus 2 is returned to the power transmission active state (step S87).

After that, if the vehicle 3 moves further away from the power transmission side resonance circuit 43 of the ground power supplying apparatus 2 and magnetic field resonant coupling between the power transmission side resonance circuit 43 and power reception side resonance circuit 51 is lost, power reception end processing is performed at the vehicle 3 (step S67). In the power reception end processing, the values of the parameters included in the power reception end information are calculated, and the calculated power reception end information is sent from the vehicle 3 to the server 91. Further, at this time, the power transmission end processing is performed at the ground power supplying apparatus 2 (step S88). At the power transmission end processing, the values of the parameters included in the power transmission end information are calculated, and the calculated power transmission end information is sent from the ground power supplying apparatus 2 to the server 91. At the ground power supplying apparatus 2, if the power transmission end processing is performed, the supply of current to the power transmission side resonance circuit 43 is stopped, and accordingly the ground power supplying apparatus 2 is again set to the reception standby state (step S89).

After that, if the vehicle 3 departs from the nearby region of the ground power supplying apparatus 2, as explained above, the vehicle identification information of the vehicle 3 is erased from the identification information list of the ground power supplying apparatus 2 (step S90). Further, along with this, the vehicle 3 no longer receives a list registration notification notifying registration of the vehicle identification information in the identification information list of the ground power supplying apparatus 2 (step S68). If the vehicle identification information of the vehicle 3 is erased from the identification information list, there is no longer a vehicle 3 requiring the supply of power, near the ground power supplying apparatus 2, therefore the ground power supplying apparatus 2 is returned to the sleep state (step S91). Further, if the vehicle 3 no longer receives a list registration notification, there is no ground power supplying apparatus 2 near the vehicle 3, therefore the vehicle 3 is also returned to the sleep state (step S69).

Transitions s in State and Operation of Ground Power Supplying Apparatus

Figure 12:
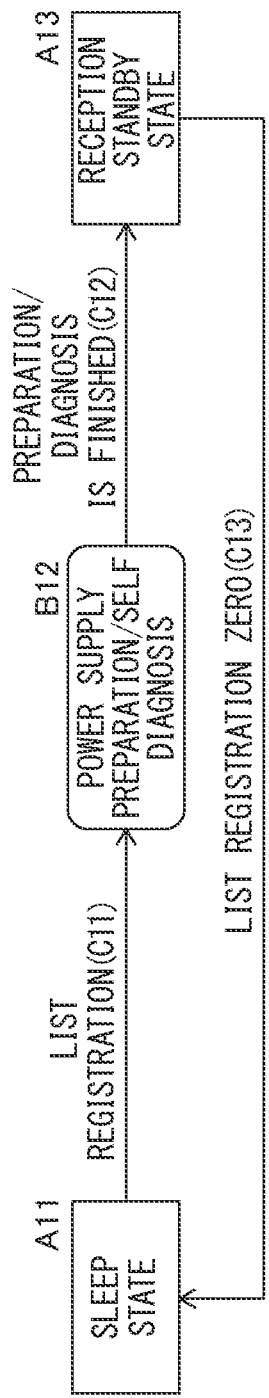
FIG. 12 is a view schematically showing transitions in the states and operations of the ground power supplying apparatus.
Figure 13:
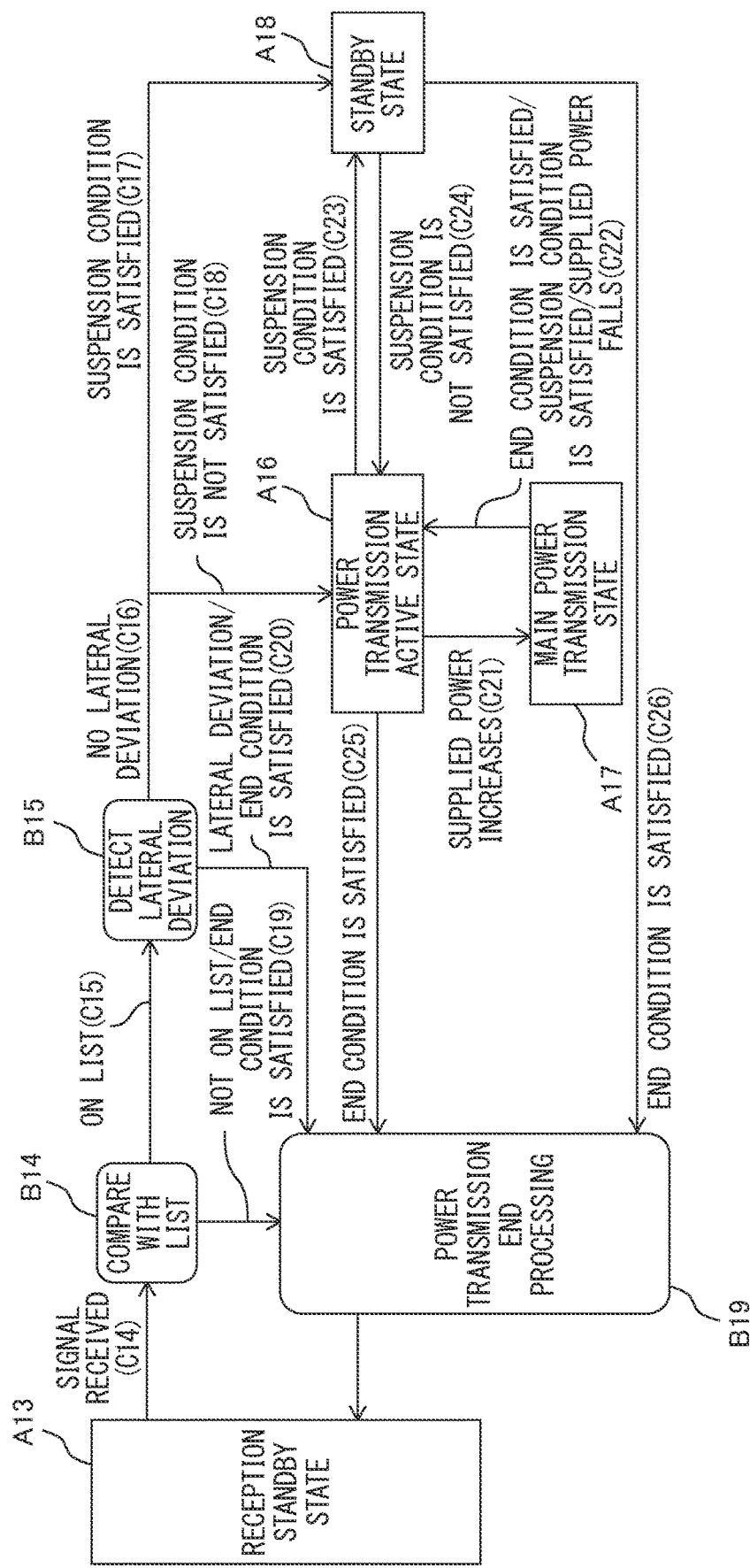
FIG. 13 is a view schematically showing transitions in the states and operations of the ground power supplying apparatus.

Next, referring to FIGS. 12 and 13, the state and operation of a ground power supplying apparatus 2 will be explained. FIGS. 12 and 13 are views schematically showing transitions in the state and operation of the ground power supplying apparatus 2. In particular, FIG. 12 shows the transitions in the state and operation when a vehicle 3 is not positioned near the ground power supplying apparatus 2, specifically the transitions in the state and operation between the sleep state and reception standby state. On the other hand, FIG. 13 shows the transitions in the state and operation when a vehicle 3 is positioned near the ground power supplying apparatus 2, specifically the transitions in the state and operation among the reception standby state, power transmission active state, main power transmission state, and standby state. Note that, in FIGS. 12 and 13 as well, the sharp corner rectangles show states of the ground power supplying apparatus 2, while the rounded corner rectangles show the operations of the ground power supplying apparatus 2.

When the ground power supplying apparatus 2 is in the sleep state shown in FIG. 12 (A11. State of step S81 and step S91 of FIG. 11), the ground power supplying apparatus 2 is supplied with only standby power. Therefore, at this time, the controller 22 of the ground power supplying apparatus 2 is supplied with only the minimum required amount of standby power, and the other equipment relating to the power transmission to the vehicle 3 is not supplied with power. For example, the power transmission side resonance circuit 43, ground side second communication device 82, ground side sensors 23, and magnetic field detector 66 are not supplied with power. Further, the controller 22 is also only supplied with small power. For this reason, when the ground power supplying apparatus 2 is in the sleep state, the power consumed by the equipment relating to power transmission of the ground power supplying apparatus 2 is small. However, even if the ground power supplying apparatus 2 is in the sleep state, power is supplied to the ground side first communication device 81. For this reason, it is possible to receive, from the server 91, the vehicle identification information of the vehicle 3 positioned within the nearby region of the ground power supplying apparatus 2.

When the ground power supplying apparatus 2 is in the sleep state (A11), if the ground side first communication device 81 receives vehicle information, and vehicle identification information included in the vehicle information is registered in the identification information list (C11), power starts to be supplied to equipment relating to power transmission of the ground power supplying apparatus 2 whereby this equipment is actuated and this equipment is self-diagnosed (B12). Specifically, the controller 22 is supplied with sufficient power for the controller 22 to completely operate, and the ground side second communication device 82, ground side sensors 23, magnetic field detector 66, etc. are supplied with power. Further, in the controller 22, a self-diagnosis program is run and the controller 22, ground side second communication device 82, ground side sensors 23, etc. are self-diagnosed.

If such an actuation of equipment actuated and self-diagnosis are completed (C12), the ground power supplying apparatus 2 is in the reception standby state (A13. State of steps S83 and S89 of FIG. 11). When the ground power supplying apparatus 2 is in the reception standby state (A13), power is supplied to the ground side second communication device 82, and thus the ground side second communication device 82 is able to receive a signal. In addition, in the present embodiment, when the ground power supplying apparatus 2 is in the reception standby state, the controller 22, ground side sensors 23, magnetic field detector 66, etc., are also supplied with enough power. Therefore, when the ground power supplying apparatus 2 is in the reception standby state, if a signal is emitted from the vehicle side second communication device 72 at a distance close from the ground side second communication device 82, the ground side second communication device 82 can receive this signal. On the other hand, when the ground power supplying apparatus 2 is in the reception standby state (A13), the power transmission side resonance circuit 43 of the ground power supplying apparatus 2 is not supplied with power. Therefore, even if the power reception side resonance circuit 51 of the vehicle 3 approaches the power transmission side resonance circuit 43 of the ground power supplying apparatus 2, power is not supplied from the ground power supplying apparatus 2 to the vehicle 3. Further, when the ground power supplying apparatus 2 is in the reception standby state, the power transmission side resonance circuit 43 of the ground power supplying apparatus 2 is not supplied with power, therefore the power consumed by the ground power supplying apparatus 2 is not that great.

When the ground power supplying apparatus 2 is in the reception standby state (A13), if the state of the ground power supplying apparatus 2 becomes a state where vehicle identification information of not even one vehicle is registered in the identification information list of the ground power supplying apparatus 2 (C13), the ground power supplying apparatus 2 is returned to the sleep state (A11), since no vehicle 3 will arrive near this ground power supplying apparatus 2 for the time being.

On the other hand, as shown in FIG. 13, when the ground power supplying apparatus 2 is in the reception standby state (A13), if the vehicle 3 approaches the ground power supplying apparatus 2, the ground side second communication device 82 of the ground power supplying apparatus 2 receives a signal including vehicle identification information emitted from the vehicle side second communication device 72 (C14). If the ground side second communication device 82 receives a signal including vehicle identification information, the vehicle identification information included in the signal is stored in the memory 222 of the controller 22, as vehicle identification information of the vehicle 3 during supply of power. In addition, the vehicle identification information included in the signal and the vehicle identification information registered in the identification information list stored in the memory 222 are compared (B14).

The vehicle identification information of the vehicle 3 is transmitted in advance through the vehicle side first communication device 71 and the ground side first communication device 81 to the ground power supplying apparatus 2, therefore the vehicle identification information included in the signal emitted from the vehicle side second communication device 72 is basically registered in the identification information list. However, for example, due to a malfunction of the vehicle side first communication device 71 or the like, the vehicle identification information will sometimes not be registered in advance in the identification information list. If the vehicle identification information is not registered in the identification information list (C19) in this way, power transmission end processing for ending power transmission is performed (B19) without power being supplied from the ground power supplying apparatus 2 to the vehicle 3. Further, if a later explained end condition is satisfied (C19) during comparison of the vehicle identification information which had been included in the signal and the vehicle identification information registered in the identification information list, power transmission end processing for ending power transmission is performed (B19). Details of the power transmission end processing will be explained later.

On the other hand, if as a result of comparison, the vehicle identification information which had been included in the signal received from the vehicle side second communication device 72 had been registered in the identification information list (C15), next, the presence of any lateral deviation between the power transmission side resonance circuit 43 and power reception side resonance circuit 51 is detected by the lateral deviation detection device (B15). If lateral deviation occurs between the power transmission side resonance circuit 43 and power reception side resonance circuit 51, the efficiency of power supply therebetween falls. Therefore, if the occurrence of lateral deviation between the power transmission side resonance circuit 43 and power reception side resonance circuit 51 is detected by the lateral deviation detection device (C20), power transmission end processing for ending power transmission is performed (B19) without power being supplied from the ground power supplying apparatus 2 to the vehicle 3. Further, if during detection of the presence of any lateral deviation by the lateral deviation detection device, the later explained end condition is not satisfied (C20), power transmission end processing for ending power transmission is performed (B19).

On the other hand, if no lateral deviation between the power transmission side resonance circuit 43 and power reception side resonance circuit 51 is detected by the lateral deviation detection device (C16), it is judged if the later explained suspension condition is satisfied. If the suspension condition is not satisfied (C18), the ground power supplying apparatus 2 is switched from the reception standby state (A13) to the power transmission active state (A16. State at steps S85 and S87 of FIG. 11).

When the ground power supplying apparatus 2 is in the power transmission active state (A16), similarly to the reception standby state (A13), the ground side second communication device 82, controller 22, ground side sensors 23, magnetic field detector 66, etc., are supplied with power. In addition, at this time, the power transmission side resonance circuit 43 of the ground power supplying apparatus 2 is supplied with weak power. By the power transmission side resonance circuit 43 being supplied with weak power, if the power reception side resonance circuit 51 of the vehicle 3 approaches the power transmission side resonance circuit 43 of the ground power supplying apparatus 2 and is positioned over the power transmission side resonance circuit 43, magnetic field resonant coupling is generated between the power transmission side resonance circuit 43 and power reception side resonance circuit 51, and the current flowing in the power transmission side resonance circuit 43 increases.

Therefore, when the ground power supplying apparatus 2 is in the power transmission active state (A16), if the current flowing in the power transmission side resonance circuit 43 increases (C21), it means the power reception side resonance circuit 51 of the vehicle 3 has moved over the power transmission side resonance circuit 43 of the ground power supplying apparatus 2. Therefore, in this case, the ground power supplying apparatus 2 is switched to the main power transmission state (A17. State at step S86 of FIG. 11).

When the ground power supplying apparatus 2 is in the main power transmission state (A17), similarly to the reception standby state (A13), the ground side second communication device 82, controller 22, ground side sensors 23, magnetic field detector 66, etc., are supplied with power. In addition, at this time, in order to transmit power to the vehicle 3, a greater power compared with the power transmission active state (A16) is supplied to the power transmission side resonance circuit 43 of the ground power supplying apparatus 2. As a result, strong magnetic field resonant coupling is generated between the power transmission side resonance circuit 43 and power reception side resonance circuit 51, and large power is supplied from the power transmission apparatus 4 of the ground power supplying apparatus 2 to the power reception apparatus 5 of the vehicle 3. In particular, in the present embodiment, the power supplied to the power transmission side resonance circuit 43 at this time, is set based on the demanded supplied power included in the vehicle information tied with the vehicle identification information. Specifically, the larger the demanded supplied power, the larger the power supplied to the power transmission side resonance circuit 43. The demanded supplied power may change during supply of power from the power transmission apparatus 4 to the power reception apparatus 5 if, for example, the speed of the vehicle 3 is slow and the time during which the power reception side resonance circuit 51 is positioned over the power transmission side resonance circuit 43 is long. In this case, the power supplied to the power transmission side resonance circuit 43 also changes in accordance with the change in the demanded supplied power.

When the ground power supplying apparatus 2 is in the main power transmission state (A17), if the power reception side resonance circuit 51 of the vehicle 3 moves away from the power transmission side resonance circuit 43 of the ground power supplying apparatus 2, as explained above, the current flowing to the power transmission side resonance circuit 43 of the ground power supplying apparatus 2 falls. If the current flowing to the power transmission side resonance circuit 43 of the ground power supplying apparatus 2 falls (C22) in this way, the ground power supplying apparatus 2 is switched from the main power transmission state (A17) to the power transmission active state (A16). In addition, when the ground power supplying apparatus 2 is in the main power transmission state, if the later explained end condition is satisfied or if the later explained suspension condition is satisfied, the ground power supplying apparatus 2 is switched to the power transmission active state (A16). As a result, if the end condition is satisfied and power transmission is ended or if the suspension condition is satisfied and power transmission is suspended, the ground power supplying apparatus 2 is temporarily set to the power transmission active state (A16) and, accordingly, the power supplied to the power transmission side resonance circuit 43 is kept from rapidly falling to zero. For this reason, the load on the power transmission side resonance circuit 43 and other equipment due to the power supplied to the power transmission side resonance circuit 43 rapidly falling to zero, is reduced.

If the suspension condition is satisfied (C23) when the ground power supplying apparatus 2 is in the power transmission active state (A16), or if the suspension condition is satisfied (C17) when no lateral deviation is detected by the lateral deviation detection device, the ground power supplying apparatus 2 is switched to the standby state (A18).

The standby state of the ground power supplying apparatus 2 is basically the same state as the reception standby state. Therefore, when the ground power supplying apparatus 2 is in the standby state (A18), the ground side second communication device 82, controller 22, ground side sensors 23, magnetic field detector 66, etc., are supplied with sufficient power, while the power transmission side resonance circuit 43 is not supplied with power. Therefore, when the ground power supplying apparatus 2 is in the standby state (A18), power is not supplied from the ground power supplying apparatus 2 to the vehicle 3 and, further, similarly to the reception standby state, the consumed power is not that great.

In this regard, a suspension condition is a condition due to which power transmission from the ground power supplying apparatus 2 to the vehicle 3 has to be temporarily suspended. Below, specific examples of the suspension condition will be listed. All of the suspension conditions listed below may be used, or some of the suspension conditions need not be used. In the present embodiment, if any one of the following suspension conditions is satisfied, the ground power supplying apparatus 2 is switched to the standby state (A18).

A first suspension condition is that lateral deviation become detected between the power transmission side resonance circuit 43 and power reception side resonance circuit 51 by the lateral deviation detection device. As explained above, if lateral deviation occurs, the power supply efficiency falls, therefore the power supply is cancelled when lateral deviation is detected.

In this regard, as explained above, when a vehicle 3 approaches a ground power supplying apparatus 2, the detection of lateral deviation is also performed by the lateral deviation detection device (B15). In this case, the power reception side resonance circuit 51 of the vehicle 3 may greatly deviate from the power transmission side resonance circuit 43 of the ground power supplying apparatus 2. In contrast, if it is once detected that no lateral deviation has occurred when the vehicle 3 approaches the ground power supplying apparatus 2 (C16), after that, a large lateral deviation becomes hard to occur even if lateral deviation occurs between the power reception side resonance circuit 51 and power transmission side resonance circuit 43. For this reason, lateral deviation being detected between the power reception side resonance circuit 51 and power transmission side resonance circuit 43 by the lateral deviation detection device is not used as an end condition for ending power transmission, but is used as a suspension condition. However, the lateral deviation being detected may be used as an end condition for ending power transmission.

A second suspension condition is that communication between the ground side first communication device 81 of the ground power supplying apparatus 2 and the server 91 is disrupted. In this regard, the ground side first communication device 81 periodically communicates with the server 91 and, for example, receives vehicle information of a vehicle 3 being supplied with power (in particular, the demanded supplied power etc.) Further, the ground power supplying apparatus 2 transmits power to the vehicle 3 based on the received vehicle information. Therefore, if it becomes no longer possible to receive vehicle information of the vehicle 3, the ground power supplying apparatus 2 can no longer suitably control the power supply. For this reason, when communication is disrupted, transmission of power to the vehicle 3 is temporarily suspended.

A third suspension condition is that the temperature of the power transmission apparatus 4 of the ground power supplying apparatus 2, in particular the temperature of the power transmission side rectification circuit 41, inverter 42, or power transmission side resonance circuit 43, become greater than or equal to a predetermined suspension reference temperature. In order for the temperature of the power transmission apparatus 4 to be kept from becoming excessively high, the transmission of power to the vehicle 3 is temporarily suspended if this suspension condition is satisfied. The temperature of the power transmission apparatus 4 is detected by the ground side sensors 23 (power transmission apparatus temperature sensor).

A fourth suspension condition is that the speed of the vehicle 3 running over the power transmission apparatus 4 is greater than or equal to a predetermined suspension reference speed. If the speed of the vehicle 3 is greater than or equal to the suspension reference speed, the power supply efficiency is low, therefore the transmission of power to the vehicle 3 is temporarily suspended if this suspension condition is satisfied. The speed of the vehicle 3, for example, is calculated based on the trends in the power supplied from the power transmission apparatus 4 to the power reception apparatus 5.

A fifth suspension condition is that a foreign object or living object be present on the road in which the power transmission apparatus 4 is buried. If there is a foreign object or living object present over the power transmission apparatus 4, the alternating magnetic field generated by the power transmission side resonance circuit 43 changes and the power supply efficiency may fall along with this, therefore transmission of power to the vehicle 3 is temporarily suspended if this suspension condition is satisfied. The foreign object or living object on the road in which the power transmission apparatus 4 is buried is detected by the ground side sensors 23 (foreign object sensor and living object sensor).

The sixth suspension condition is that the power (or current or voltage) supplied to the power transmission side resonance circuit 43 of the power transmission apparatus 4 is greater than or equal to a predetermined suspension reference value. If the power supplied to the power transmission side resonance circuit 43 is excessively large, there is a possibility of an abnormality occurring in the power transmission side resonance circuit 43, therefore transmission of power to the vehicle 3 is temporarily suspended if this suspension condition is satisfied. The power supplied to the power transmission side resonance circuit 43 is calculated based on the outputs of the ground side sensors 23 (power transmission apparatus current sensor and power transmission apparatus voltage sensor).

When the ground power supplying apparatus 2 is in the standby state (A18), if all of the above-mentioned suspension conditions is no longer satisfied (C24), the ground power supplying apparatus 2 is switched to the power transmission active state (A16).

If an end condition is satisfied (C25) when the ground power supplying apparatus 2 is in the power transmission active state (A16), if an end condition is satisfied (C26) when the ground power supplying apparatus 2 is in the standby state (A18), or if an end condition is satisfied otherwise, the power transmission end processing is performed (B19. State at step S88 of FIG. 11).

At the power transmission end processing, power transmission end information is transmitted from the ground side first communication device 81 of the ground power supplying apparatus 2 to the server 91. The power transmission end information, as explained above, includes information relating to power transmission to the vehicle 3. The values of the various parameters included in the power transmission end information are calculated based on the outputs of the ground side sensors 23 or the like. In addition, at the power transmission end processing, the vehicle identification information of the vehicle 3 during power supply, stored in the memory 222 of the ground power supplying apparatus 2 due to the operation shown in B14, is erased from the memory 222. If the power transmission end processing ends, the ground power supplying apparatus 2 is switched to the reception standby state (A13).

In this regard, an end condition is a condition due to which power transmission from the ground power supplying apparatus 2 to the vehicle 3 has to be ended. Below, specific examples of the end condition will be listed. All of the end conditions listed below may be used, or some of the end conditions need not be used. In the present embodiment, the power transmission end processing is performed, if any one of the following end conditions is satisfied.

A first end condition is that a vehicle 3 which had approached the ground power supplying apparatus 2 be detected moving away from the ground power supplying apparatus 2. If the vehicle 3 passes beyond the power transmission apparatus 4 of the ground power supplying apparatus 2, no further power is transmitted from the ground power supplying apparatus 2 to that vehicle 3, therefore the transmission of power to the vehicle 3 is ended if this end condition is satisfied. The vehicle 3 moving away from the ground power supplying apparatus 2 is detected by any technique. Specifically, for example, the vehicle 3 moving away from the ground power supplying apparatus 2 is detected by the signal which the vehicle side second communication device 72 emits being no longer received by the ground side second communication device 82. Further, for example, a magnetic field detector such as one able to be used in the lateral deviation detection device may be arranged at the back of the power transmission apparatus 4 in the direction of advance of the vehicle 3, and the alternating magnetic field generated from the alternating magnetic field generation circuit 61 of the vehicle 3 may be detected by this magnetic field detector to thereby detect the vehicle 3 moving away from the ground power supplying apparatus 2.

A second end condition is that the ground side second communication device 82 of the ground power supplying apparatus 2 receive a signal including vehicle identification information different from the vehicle identification information of the vehicle 3 during power supply stored in the memory 222 of the ground power supplying apparatus 2 in the operation shown in B14. In other words, the second end condition is that the ground side second communication device 82 receive vehicle identification information of a vehicle different from the vehicle 3 to which power is being transmitted or the vehicle 3 to which power had finished being transmitted right before. If a following vehicle is coming up so fast that the ground side second communication device 82 receives a signal including vehicle identification information in this way, it is necessary to avoid confusion between the vehicle currently being transmitted power to and the following vehicle, therefore power transmission to the vehicle 3 is ended. As explained above, due to this end condition being satisfied, if the power transmission end processing is performed early, the vehicle identification information of the vehicle 3 currently being supplied with power stored, in the memory 222 of the ground power supplying apparatus 2, can be erased from the memory 222 early. Accordingly, it is possible to erase vehicle identification information of the vehicle 3 being supplied with power, before power transmission to the following vehicle is started.

A third end condition is that the elapsed time, from when vehicle identification information of the vehicle 3 being supplied with power is registered in the memory 222 of the ground power supplying apparatus 2, become greater than or equal to a predetermined end reference time. If the elapsed time becomes too long, there is a possibility that the ground power supplying apparatus 2 will not be able to detect the vehicle 3 moving away or other abnormalities will occur, therefore power finishes being transmitted to the vehicle 3 if this end condition is satisfied. Note that, the third end condition may be another condition so long as a condition showing that the vehicle 3 has been occupying the space above the power transmission apparatus 4 of the ground power supplying apparatus 2 over a long period of time. Therefore, for example, the third end condition may be that the time period during the ground power supplying apparatus 2 is in the power transmission active state or standby state within the time period from when the vehicle identification information of the vehicle 3 being supplied with power is registered in the memory 222, become greater than or equal to a predetermined time.

A fourth end condition is that equipment relating to transmission of power to the vehicle 3 of the ground power supplying apparatus 2 is malfunctioning. When the ground power supplying apparatus 2 is malfunctioning, it is not possible to suitably supply power from the ground power supplying apparatus 2 to the vehicle 3, therefore when this end condition is satisfied, transmission of power to the vehicle 3 is ended. A malfunction of the ground power supplying apparatus 2 is, for example, detected by self-diagnosis of equipment relating to power transmission to the vehicle 3 of the ground power supplying apparatus 2 (performed in the operation shown by B12 as well).

A fifth end condition is there being an end request from outside of the noncontact power supplying system 1. For example, an end request is transmitted from outside of the noncontact power supplying system 1 to the ground power supplying apparatus 2, if road work is started near the ground power supplying apparatus 2 or if a disaster occurs. This end request is transmitted from a system outside of the noncontact power supplying system 1 to the server 91, and is transmitted from the server 91 to the ground side first communication device 81.

A sixth end condition is that a coupling coefficient between the power transmission side resonance circuit 43 of the ground power supplying apparatus 2 and the power reception side resonance circuit 51 of the vehicle 3 is greater than or equal to a predetermined reference value, or that the power supplied from the ground power supplying apparatus 2 to the vehicle 3 is greater than or equal to a predetermined end reference value. In this regard, if the coupling coefficient is extremely large or if the transmitted power is extremely large, there is a possibility of excessive current flowing to the power transmission apparatus 4 or power reception apparatus 5. For this reason, by ending the power transmission from the ground power supplying apparatus 2 to the vehicle 3 if the coupling coefficient is greater than or equal to a reference value or the transmitted power is greater than or equal to a reference value, excessive current is kept from flowing to the power transmission apparatus 4 or the power reception apparatus 5. The power transmitted from the ground power supplying apparatus 2 to the vehicle 3 is, for example, calculated based on the outputs of the ground side sensors 23 (power transmission apparatus current sensor and power transmission apparatus voltage sensor).

A seventh end condition is that the fee amount charged to the user of the vehicle 3, calculated based on the power transmitted from the ground power supplying apparatus 2 to the vehicle 3, becomes greater than or equal to a predetermined upper limit charged amount. The fee amount charged to the user is calculated by the controller based on the trends in transmitted power during power transmission to the vehicle 3 and the charging rate per unit power at that time. Further, the upper limit charged amount may be a constant value determined in advance or may be a value set by the user of the vehicle 3. If a value is set by the user, the upper limit charged amount is included in the vehicle information transmitted from the vehicle 3.

An eighth end condition is the reception of a later explained power transmission stop request from the vehicle 3. As explained later, if a cancel condition or disconnect condition for canceling or disconnecting power reception by the power reception apparatus 5 in the vehicle 3 is satisfied, a power transmission stop request is transmitted from the vehicle side first communication device 71 of the vehicle 3. If such a cancel condition or disconnect condition is satisfied, power transmission to the vehicle 3 is ended since no further power will be received at the vehicle 3 and accordingly it is not necessary to maintain the ground power supplying apparatus 2 in a state able to transmit power to the vehicle 3.

The state and operation of the ground power supplying apparatus 2 are controlled by the controller 22. Therefore, for example, when the ground power supplying apparatus 2 is in the standby state, the controller 22 judges if the suspension condition is satisfied and if the end condition is satisfied, based on the outputs of the ground side sensors 23 or the like. Further, if judging that the suspension condition is not satisfied, the controller 22 controls the inverter 42 so that a weak current is supplied to the power transmission side resonance circuit 43.

Transitions s in State and Operation of Vehicle

Next, referring to FIGS. 14 and 15, the transitions in the state and operation of the vehicle 3 will be explained. FIG. 14 is a view schematically showing transitions in the state and operation of the vehicle 3. In FIG. 14 as well, the sharp corner rectangles show states of the vehicle 3, while the rounded corner rectangles show the operations of the vehicle 3.

Figure 14:
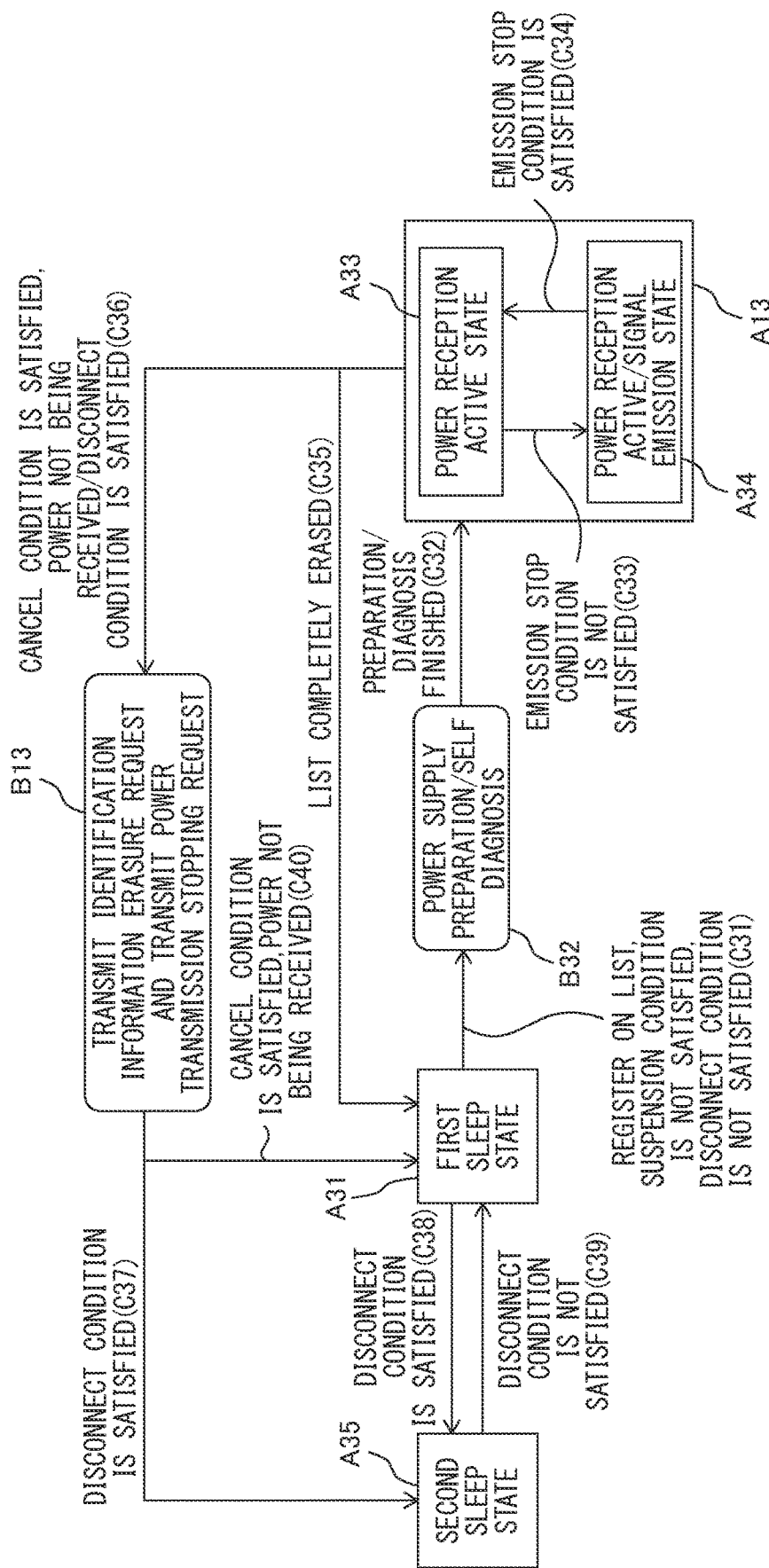
FIG. 14 is a view schematically showing transitions in the states and operations of the vehicle.

As shown in FIG. 14, the vehicle 3 can take two sleep states of a first sleep state (A31) and a second sleep state (A35) (states of steps S61 and S69 of FIG. 11). When the vehicle 3 is in the first sleep state (A31), the equipment relating to power reception of the vehicle 3 is supplied with only standby power. Therefore, at this time, the ECU 34 of the vehicle 3 is supplied with only the minimum required amount of standby power, while the other equipment relating to power reception from the ground power supplying apparatus 2 is not supplied with power. Therefore, for example, the vehicle side second communication device 72, alternating current power generation circuit 64, and vehicle side sensors 37 are not supplied with power. Further, the ECU 34 is only supplied with small power. For this reason, when the vehicle 3 is in the first sleep state (A31), the power consumed by equipment relating to power reception of the vehicle 3 is small. However, even when the vehicle 3 is in the first sleep state (A31), power is supplied to the vehicle side first communication device 71. For this reason, the vehicle side first communication device 71 can receive from the server 91 a list registration notification notifying it that vehicle identification of the vehicle 3 has been registered in the identification information list of any ground power supplying apparatus 2.

Further, in the first sleep state (A31), the relay 38 is connected between the power reception apparatus 5 and the battery 32. Therefore, if the power reception apparatus 5 and the battery 32 are connected and the power reception apparatus 5 receives power, the power is supplied to the battery 32.

When the vehicle 3 is in the first sleep state (A31), if list registration notification notifying that vehicle identification information of a vehicle 3 is registered in the identification information list of any ground power supplying apparatus 2 is received by the vehicle side first communication device 71 and the later explained cancel condition and disconnect condition are not satisfied (C31), the supply of power to equipment relating to power reception from the ground power supplying apparatus 2 of the vehicle 3 is started, the equipment are actuated, and self-diagnosis is performed at the equipment (B32). Specifically, the ECU 34 is supplied with sufficient power for completely operating, and the vehicle side second communication device 72, alternating current power generation circuit 64, vehicle side sensors 37, etc., are supplied with power. Further, at the ECU 34, a self-diagnosis program is run, and self-diagnosis of the ECU 34, vehicle side second communication device 72, alternating current power generation circuit 64, vehicle side sensors 37, etc., is performed.

If the actuation and self-diagnosis of the equipment are completed, the vehicle 3 is in the power reception active state (A33) or power reception active/signal emission state (A34. State at step S63 of FIG. 11). When the vehicle 3 is in the power reception active state (A33) or power reception active/signal emission state (A34), the ECU 34, vehicle side sensors 37, etc., are supplied with sufficient power.

Therefore, when the vehicle 3 is in the power reception active state (A33) or power reception active/signal emission state (A34), if the power reception side resonance circuit 51 of the vehicle 3 approaches the power transmission side resonance circuit 43 of the ground power supplying apparatus 2 and is positioned over the power transmission side resonance circuit 43, strong magnetic field resonant coupling is generated between the power transmission side resonance circuit 43 and power reception side resonance circuit 51, and large power is supplied from the ground power supplying apparatus 2. On the other hand, when the vehicle 3 is in the power reception active state (A33) or power reception active/signal emission state (A34), if the vehicle 3 moves and the power reception side resonance circuit 51 separates from the power transmission side resonance circuit 43 from a state where strong magnetic field resonant coupling is generated between the power transmission side resonance circuit 43 and power reception side resonance circuit 51, the magnetic field resonant coupling is broken and the supply of power from the ground power supplying apparatus 2 to the vehicle 3 is ended.

Further, when the vehicle 3 is in the power reception active state (A33), the vehicle side second communication device 72 and alternating current power generation circuit 64 are not supplied with power. Therefore, the vehicle side second communication device 72 cannot emit a signal including the vehicle identification information of the vehicle 3. Further, the alternating current power generation circuit 64 cannot generate an alternating magnetic field for detection of lateral deviation. On the other hand, when the vehicle 3 is in the power reception active/signal emission condition (A34), the vehicle side second communication device 72 and alternating current power generation circuit 64 are supplied with power. Therefore, the vehicle side second communication device 72 emits a signal including the vehicle identification information of the vehicle 3, and the alternating current power generation circuit 64 generates an alternating magnetic field for detection of lateral deviation. Therefore, at this time, if the vehicle 3 runs near the ground power supplying apparatus 2, a signal including vehicle identification information is transmitted from the vehicle side second communication device 72 to the ground side second communication device 82.

Note that, when the vehicle 3 is in the power reception active state (A33), the vehicle side second communication device 72 and alternating current power generation circuit 64 are not supplied with power, therefore the power consumed by the vehicle 3 is not that great. On the other hand, when the vehicle 3 is in the power reception active/signal emission state (A34), the vehicle side second communication device 72 and alternating current power generation circuit 64 are supplied with power, therefore the power consumed is greater compared with the power reception active state (A33).

When the vehicle 3 is in the power reception active state (A33), if none of the emission stop conditions are satisfied (C33), the vehicle 3 is switched to the power reception active/signal emission state (A34). On the other hand, when the vehicle 3 is in the power reception active/signal emission state (A34), if an emission stop condition is satisfied (C34), the vehicle 3 is switched to the power reception active state (A33).

In this regard, an emission stop condition is a condition due to which emission of a signal from the vehicle side second communication device 72 has to be temporarily stopped. By temporarily stopping emission of a signal from the vehicle side second communication device 72, a ground side second communication device 82 is no longer sent the signal including vehicle identification information, and accordingly power is no longer transmitted from the ground power supplying apparatus 2. Below, specific examples of the emission stop condition will be given. All of the emission stop conditions listed below may be used, or some of the emission stop conditions need not be used. In the present embodiment, if any one of the following emission stop conditions is satisfied, the vehicle 3 is in the power reception active state (A33), while if none is satisfied, the vehicle 3 is in the power reception active/signal emission state (A34).

A first emission stop condition is that other processing making large power flow into the battery 32 is being performed at the vehicle 3. If the battery 32 is being rapidly charged by a method other than noncontact power transfer, it is difficult to simultaneously supply power by noncontact power transfer to the battery 32, therefore signal emission is temporarily stopped so as to temporarily stop transmission of power from the ground power supplying apparatus 2. The above other processing includes, for example, starting or stopping of the internal combustion engine if the vehicle 3 is a hybrid vehicle also driven by an internal combustion engine. This other processing, for example, is detected from outputs of the vehicle side sensors 37 provided at the vehicle 3, control commands from the ECU 34 to the internal combustion engine, or the like.

A second emission stop condition is that the vehicle 3 is currently being sharply braked. If the vehicle 3 is currently being sharply braked, the battery 32 is charged by the regenerated power, therefore it becomes difficult to simultaneously efficiently supply power due to noncontact power transfer to the battery 32, and therefore emission of a signal is temporarily stopped in order to temporarily stop power transmission from the ground power supplying apparatus 2. Whether the vehicle 3 is currently being sharply braked, for example, is detected based on the amount of depression of the brake pedal of the vehicle 3.

A third emission stop condition is that the vehicle 3 is currently changing a lane. If the vehicle 3 is currently changing a lane, even if the vehicle 3 is running near a ground power supplying apparatus 2, the lateral deviation between the power transmission side resonance circuit 43 and power reception side resonance circuit 51 is large, therefore emission of a signal is temporarily stopped so as to temporarily stop transmission of power from the ground power supplying apparatus 2. The vehicle 3 currently changing a lane is detected, for example, based on an image captured by a front camera provided at the vehicle 3 (not shown), or the like.

A fourth emission stop condition is that the vehicle 3 approaches the left or right dividing line or sticks out from the left or right dividing line. In this case as well, even if the vehicle 3 is running near the ground power supplying apparatus 2, the lateral deviation between the power transmission side resonance circuit 43 and power reception side resonance circuit 51 is large, therefore emission of a signal is temporarily stopped so as to temporarily stop transmission of power from the ground power supplying apparatus 2. Whether or not the vehicle 3 is approaching the left or right dividing line or sticking out from the dividing line is detected, for example, based on an image captured by a front camera provided at the vehicle 3 (not shown) or the like.

A fifth emission stop condition is that if the vehicle 3 is provided with a magnetic field detector of the lateral deviation detection device, lateral deviation is detected between the power transmission side resonance circuit 43 and power reception side resonance circuit 51 by this lateral deviation detection device. As explained above, if lateral deviation has occurred, the power supply efficiency falls, therefore when lateral deviation is detected, emission of a signal is temporarily stopped so as to temporarily stop transmission of power from the ground power supplying apparatus 2.

A sixth emission stop condition is that communication between the vehicle side first communication device 71 of the vehicle 3 and the server 91 is disrupted for less than a certain time. In this regard, the vehicle side first communication device 71 periodically communicates with the server 91 and, for example, transmits vehicle information of the vehicle 3 currently being supplied with power (in particular, the demanded supplied power, etc.) Further, if it is no longer possible to transmit vehicle information of the vehicle 3, it becomes no longer possible to suitably control the power supply. For this reason, when communication is disrupted, emission of a signal is temporarily stopped so as to temporarily stop transmission of power from the ground power supplying apparatus 2.

Note that, if the vehicle 3 is provided with a magnetic field detector of a lateral deviation detection device and a magnetic field generation circuit is buried a certain extent in front of the power transmission apparatus 4 of the ground power supplying apparatus 2 in the running direction of the vehicle 3, it is possible detect the approach of the vehicle 3 to the ground power supplying apparatus 2 by this magnetic field detector. In such a case, an emission stop condition (seventh emission stop condition) may be that the approach of the vehicle 3 to the power transmission apparatus 4 of the ground power supplying apparatus 2 is not detected by the magnetic field detector of the ground power supplying apparatus 2. Due to this, it is possible to make the vehicle side first communication device 71 emit a signal only when the vehicle 3 has approached the ground power supplying apparatus 2.

When the vehicle 3 is in the power reception active state (A33) or power reception active/signal emission state (A34), if the vehicle side first communication device 71 of the vehicle 3 no longer receives a list registration notification, that is, if vehicle identification information of the vehicle 3 is no longer registered in the identification information list of any ground power supplying apparatus 2 (C35), the vehicle 3 is returned to the first sleep state (A31).

On the other hand, when the vehicle 3 is in the power reception active state (A33) or power reception active/signal emission state (A34), if a later explained cancel condition is satisfied and the power reception apparatus 5 is not currently receiving power from the power transmission apparatus 4 of the ground power supplying apparatus 2, or if a later explained disconnect condition is satisfied (C36), an identification information erasure request and power transmission stopping request are transmitted from the vehicle side first communication device 71 to the server 91, and in turn to the corresponding ground power supplying apparatus 2.

An identification information erasure request is a request for erasure of that vehicle identification information of the vehicle 3 from the identification information list of the corresponding ground power supplying apparatus 2. The ground power supplying apparatus 2 to which the erasure request is intended to be given may also be all of the ground power supplying apparatuses 2 of which vehicle identification information of the vehicle 3 is registered at the identification information list, or may be only a ground power supplying apparatus 2 positioned near the current position of that vehicle 3. A ground power supplying apparatus 2 receiving an identification information erasure request erases the vehicle identification information of that vehicle 3 from the identification information list stored in the memory 222 of the ground power supplying apparatus 2.

A power supply stopping request is a request for stopping supply of power from a corresponding ground power supplying apparatus 2 to a vehicle 3. A ground power supplying apparatus 2 to which a stopping request is intended to be given is a ground power supplying apparatus 2 positioned near the current position of that vehicle 3. The ground power supplying apparatus 2 receiving a power transmission request stops power transmission, when transmitting power to that vehicle 3.

By transmitting an identification information erasure request and power transmission stopping request to the ground power supplying apparatus 2 in this way, it is no longer necessary to switch the ground power supplying apparatus 2 unnecessarily from the sleep state (A11) to the reception standby state (A13) or the power transmission active state (A16), and it is possible to suppress power consumption of the ground power supplying apparatus 2.

When an identification information erasure request and power transmission stopping request are transmitted from the vehicle side first communication device 71 (B13), if a disconnect condition is satisfied (C37), the vehicle 3 is switched to the second sleep state (A35). Further, when the vehicle is the first sleep state (A31), if a disconnect condition is satisfied (C38) as well, the vehicle 3 is switched to the second sleep state (A35).

When the vehicle 3 is in the second sleep state (A35), similarly to the first sleep state (A31), the vehicle 3 is supplied with only the standby power. However, when the vehicle 3 is in the second sleep state (A35), the relay 38 is disconnected. Therefore, the connection of the power reception apparatus 5 and the battery 32 is broken, and the power reception apparatus 5 cannot substantially receive power.

When the vehicle 3 is in the second sleep state (A35) and a disconnect condition is no longer satisfied (C39), the vehicle 3 is switched to the first sleep state (A31).

In this regard, a disconnect condition is a condition in which the power reception apparatus 5 and the battery 32 have to be disconnected in addition to the cancel of reception of power from the ground power supplying apparatus 2 to the vehicle 3. Below, specific examples of a disconnect condition will be listed. All of the disconnect conditions listed below may be used, or some of the disconnect conditions need not be used. In the present embodiment, if any one of the following disconnect conditions is satisfied, the vehicle 3 is switched to the second sleep state (A35).

A first disconnect condition is that the state of charge SOC of the battery 32 is greater than or equal to a limit value of the state of charge. The limit value of the state of charge is a predetermined value such that, in the structure of the battery 32, it is difficult to charge the battery 32 any more, and, for example, is greater than or equal to 95%. If the state of charge SOC of the battery 32 is greater than or equal to the limit value of the state of charge, it is not possible to charge the battery 32 for the time being, therefore the power reception apparatus 5 and the battery 32 are disconnected. The state of charge SOC of the battery 32 is calculated at the ECU 34, based on the value of the charge current and value of the discharge current of the battery 32 detected by a vehicle side sensor 37 (current sensor).

A second disconnect condition is that the temperature of the battery 32 is greater than or equal to a battery limit temperature. The limit temperature is a temperature at which the battery 32 will increasingly deteriorate if the temperature of the battery 32 becomes greater than or equal to the battery limit temperature. If the temperature of the battery 32 becomes greater than or equal to the battery limit temperature, the battery 32 cannot be charged for the time being since it would invite a rise in temperature of the battery 32, therefore the power reception apparatus 5 and the battery 32 are disconnected. The temperature of the battery 32 is detected by the vehicle side sensor 37 (battery temperature sensor).

A third disconnect condition is that the temperature of the power reception apparatus 5 of the vehicle 3, in particular, the temperature of the power reception side resonance circuit 51 and power reception side rectification circuit 54, is greater than or equal to a predetermined power reception apparatus limit temperature. The power reception apparatus limit temperature is a temperature at which there is a possibility of an abnormality occurring in the power reception apparatus 5 if the temperature of power reception apparatus 5 becomes further higher than that. If the temperature of the power reception apparatus 5 is greater than or equal to the power reception apparatus limit temperature, it is not possible to use the power reception apparatus 5 for the time being since it would invite a rise in temperature of the power reception apparatus 5, therefore the power reception apparatus 5 and the battery 32 are disconnected. The temperature of the power reception apparatus 5 is detected by the vehicle side sensor 37 (power reception apparatus temperature sensor).

A fourth disconnect condition is that the current flowing to the power reception apparatus 5 is greater than or equal to a limit value of current or that the voltage applied to the power reception apparatus 5 is greater than or equal to a limit value of voltage. If the current flowing to the power reception apparatus 5 or the voltage applied to the power reception apparatus 5 becomes excessively large, there is a possibility of an abnormality occurring in the power reception apparatus 5, therefore the power reception apparatus 5 and the battery 32 are disconnected. The current flowing to the power reception apparatus 5 and the voltage applied to the power reception apparatus 5 are detected by the vehicle side sensors 37 (current sensor and voltage sensor).

A fifth disconnect condition is that communication between the vehicle side first communication device 71 of the vehicle 3 and the server 91 is disrupted for greater than or equal to a constant time. As explained above, the vehicle side first communication device 71 periodically communicates with the server 91 and, for example, transmits vehicle information of the vehicle 3 currently being supplied with power (in particular, the demanded supplied power, etc.) Further, if it becomes no longer possible to transmit vehicle information of the vehicle 3, it becomes no longer possible to suitably control the power supply. In particular, when such communication is disrupted for greater than or equal to a constant period, the cause is not the occurrence of a temporary loss of communication, therefore the power reception apparatus 5 and the battery 32 are disconnected.

Note that, a disconnect condition is satisfied in a lower frequency, compared with the later explained cancel condition. In this regard, if the relay 38 handling a high voltage is frequently connected and disconnected, this becomes a factor causing abnormality of the relay 38. In the present embodiment, abnormality at the relay 38 is kept from occurring by making the disconnect condition due to which the relay 38 is disconnected a condition with a low frequency of being satisfied.

On the other hand, when an identification information erasure request and power transmission stopping request are transmitted from the vehicle side first communication device 71 (B13), if a cancel condition is satisfied (C40), the state of the vehicle 3 is switched to the first sleep state (A31).

In this regard, a cancel condition is a condition in which reception of power from the ground power supplying apparatus 2 at the vehicle 3 has to be cancelled. Below, specific examples of a cancel condition will be listed. All of the cancel conditions listed below may be used, or some of the cancel conditions need not be used. In the present embodiment, if any one of the following cancel conditions is satisfied, the vehicle 3 is switched to the first sleep state (A31).

A first cancel condition is that the state of charge SOC of the battery 32 is greater than or equal to a state of charge reference value and less than a state of charge limit value. The state of charge reference value is a predetermined value less than the above-mentioned state of charge limit value, and is, for example, greater than or equal to 80%. If the state of charge SOC of the battery 32 becomes greater than or equal to the state of charge reference value, basically it is not necessary to charge the battery 32, therefore reception of power from the ground power supplying apparatus 2 to the vehicle 3 is cancelled.

A second cancel condition is that the temperature of the battery 32 is greater than or equal to a battery reference temperature and less than a battery limit temperature. The battery reference temperature is a predetermined temperature less than the above-mentioned battery limit temperature. If the temperature of the battery 32 becomes greater than or equal to the battery reference temperature, it is necessary to keep from charging the battery 32 so that the temperature of the battery 32 does not reach the battery limit temperature, therefore reception of power from the ground power supplying apparatus 2 to the vehicle 3 is cancelled.

A third cancel condition is that the temperature of the power reception apparatus 5 of the vehicle 3, in particular the temperature of the power reception side resonance circuit 51 or power reception side rectification circuit 54, is greater than or equal to a predetermined power reception apparatus reference temperature and less than a power reception apparatus limit temperature. The power reception apparatus reference temperature is a predetermined temperature less than the above-mentioned power reception apparatus limit temperature. If the temperature of the power reception apparatus 5 becomes greater than or equal to the power reception apparatus reference temperature, it is necessary to keep the power reception apparatus 5 from being used so that the temperature of the power reception apparatus 5 does not reach the power reception apparatus limit temperature, therefore reception of power from the ground power supplying apparatus 2 to the vehicle 3 is cancelled.

A fourth cancel condition is that an allowable charged power of the battery 32 is greater than or equal to a predetermined charged power reference value. If the allowable charged power of the battery 32 is small, even if the power reception apparatus 5 receives power from the power transmission apparatus 4, there is the possibility that the power would not be able to be suitably supplied to the battery, therefore reception of power from the ground power supplying apparatus 2 to the vehicle 3 is cancelled. The allowable charged power of the battery 32 is calculated based on the outputs of the vehicle side sensors 37 (battery temperature sensor, battery current sensor, etc.)

A fifth cancel condition is that the speed of the vehicle 3 is greater than or equal to a predetermined cancel reference speed. If the speed of the vehicle 3 is greater than or equal to the cancel reference speed, the power supply efficiency falls, therefore reception of power from the ground power supplying apparatus 2 to the vehicle 3 is cancelled. The cancel reference speed may be the same as the suspension reference speed in the above-mentioned fifth suspension condition. The speed of the vehicle 3 is detected by the vehicle side sensor 37 (speed sensor).

A sixth cancel condition is that a fee amount charged to the user of the vehicle 3, calculated based on the received power of the vehicle 3 from the ground power supplying apparatus 2, is greater than or equal to a predetermined upper limit charged amount. The fee amount charged to the user is calculated by the ECU 34, based on the trends in the received power while the vehicle 3 receiving power from the ground power supplying apparatus 2 and the charging rate per unit power at that time. Further, the upper limit charged amount may be a predetermined constant value, or may be a value set for the user of the vehicle 3.

A seventh cancel condition is that there is a cancel request from the user. A cancel request from the user is, for example, output from a switch provided at the vehicle 3 for inputting whether or not it is necessary to supply power while the vehicles 3 running.

The state and operation of the vehicle 3 are controlled by the ECU 34. Therefore, for example, when the vehicle 3 is in the second sleep state (A35), the ECU 34 judges whether the disconnect condition is satisfied, based on the outputs of the vehicle side sensors 37 or the like. Further, when judging that the disconnect condition is not satisfied, the ECU 34 controls the relay 38 so that the power reception apparatus 5 and the battery 32 are connected.

Next, referring to FIG. 15, the power reception end processing will be explained. FIG. 15 is a flow chart showing the flow of operations relating to the power reception end processing. The illustrated processing is performed every certain time interval.

Figure 15:
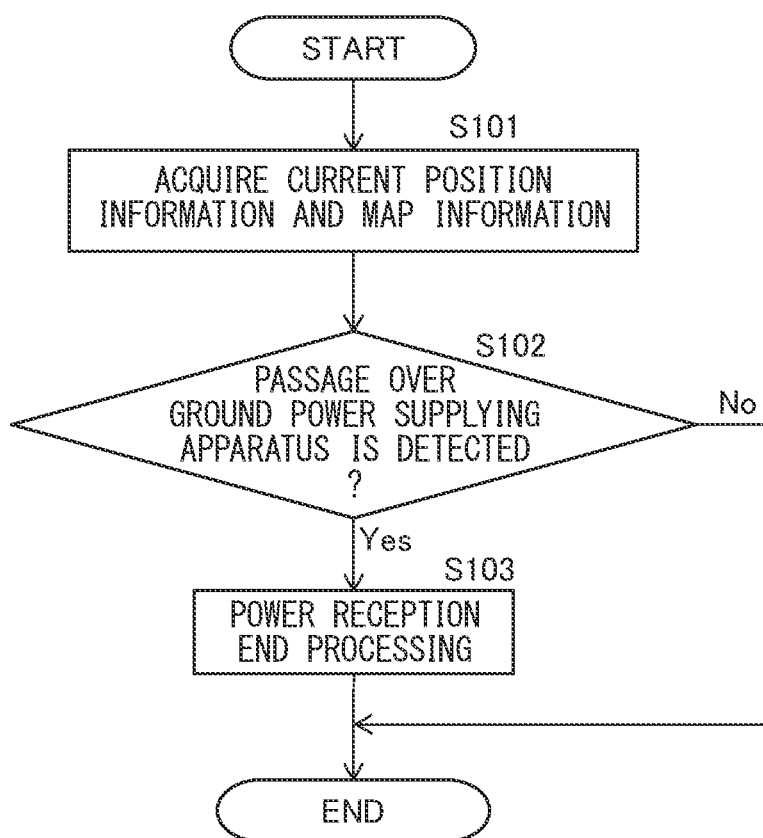
FIG. 15 is a flow chart showing a flow of work relating to performance of power reception end processing.

As shown in FIG. 15, first, the ECU 34 acquires the current position information and map information (step S101). The ECU 34 acquires the current position information of the vehicle 3 from the GNSS receiver 35. In addition, the ECU 34 acquires the map information from the storage device 36. In particular, in the present embodiment, the ECU 34 acquires map information including the installation position information of the ground power supplying apparatus 2 at the surroundings of the current position of the vehicle 3.

Next, the ECU 34 judges if the vehicle 3 has passed over any ground power supplying apparatus 2, based on the current position information and installation position information of the ground power supplying apparatus 2 acquired at step S101 (step S102).

If at step S102 it is judged that the vehicle 3 has passed over any ground power supplying apparatus 2, the ECU 34 performs the power reception end processing (step S103). At the power reception end processing, power reception end information is transmitted from the vehicle side first communication device 71 to the server 91. The power reception end information includes information relating to the reception of power from the ground power supplying apparatus 2. The values of various parameters included in the power reception end information are calculated based on the outputs of the vehicle side sensors 37. On the other hand, if at step S102 it is judged that the vehicle 3 has not passed over any ground power supplying apparatus 2, step S103 is skipped.

According to the present embodiment explained above, the ground power supplying apparatus 2 transmitting power to a vehicle 3 by noncontact is provided with a power transmission apparatus 4 having a power transmission side resonance circuit 43 (resonance circuit) and transmitting power to the vehicle 3 and a controller 22 (control device) configured to shift a state of the ground power supplying apparatus 2 to a standby state when a predetermined suspension condition is satisfied if the state of the ground power supplying apparatus 2 is a main power transmission state or a power transmission active state and to shift a state of the ground power supplying apparatus 2 to the power transmission active state when the suspension condition is no longer satisfied if the state of the ground power supplying apparatus 2 is the standby state.

The main power transmission state is a state where power is supplied to the power transmission side resonance circuit 43 and power is being supplied to the vehicle 3. The power transmission active state is a state where weak power is supplied to the power transmission side resonance circuit 43 and power can be transmitted to the vehicle 3. The standby state is a state where the supply of power to the power transmission side resonance circuit 43 is stopped and where the power transmission active state can be shifted to by supplying weak power to the power transmission side resonance circuit 43.

In this way, according to the present embodiment, when a suspension condition where transmission of power from the ground power supplying apparatus 2 to the vehicle 3 has to be temporarily suspended stands, it is possible to shift to a standby state where the power transmission active state can be immediately shifted to by supplying weak power to the power transmission side resonance circuit 43. For this reason, it is possible to quickly restart power transmission if suspending power transmission from the ground power supplying apparatus 2 to the vehicle 3.

Further, in the present embodiment, the ground power supplying apparatus 2 is provided with a ground side second communication device 82 (narrow range communication device) for directly communicating with the vehicle 3 by utilizing narrow range wireless communication. The controller 22 (control device) is configured to shift the state of the ground power supplying apparatus 2 to the reception standby state (second standby state) when a predetermined end condition is satisfied if the state of the ground power supplying apparatus 2 is the main power transmission state, the power transmission active state, or the standby state.

The reception standby state is the state where the supply of power to the power transmission side resonance circuit 43 (resonance circuit) is stopped and where if receiving vehicle identification information from the vehicle 3 by the ground side second communication device 82, the power transmission active state is shifted when that vehicle identification information is registered in a list of vehicle identification information of vehicles 3 which might be supplied by power by the ground power supplying apparatus 2 stored in the controller 22.

In this way, according to the present embodiment, it is possible to stop the supply of power to the power transmission side resonance circuit 43 and suppress the power consumed by the ground power supplying apparatus 2 when an end condition where the transmission of power from the ground power supplying apparatus 2 to the vehicle 3 has to be ended stands while it is possible to immediately shift to the power transmission active state when newly receiving the vehicle identification information.

Above, an embodiment of the present disclosure was explained, but the embodiment only shows some of the examples of application of the present disclosure and is not meant to limit the technical scope of the present disclosure to the specific constitution of the above embodiment.

For example, if changing the viewpoint, the above embodiment can also be interpreted as a method for controlling a ground power supplying apparatus 2 having a power transmission side resonance circuit 43 (resonance circuit) and transmitting power to a vehicle 3 by noncontact comprises shifting a state of the ground power supplying apparatus 2 to a standby state, which method of controlling a ground power supplying apparatus 2 comprising shifting a state of the ground power supplying apparatus 2 to a standby state where the supply of power to the power transmission side resonance circuit 43 is stopped and where the power transmission active state can be shifted to by supplying weak power to the power transmission side resonance circuit 43 when a predetermined suspension condition is satisfied if the state of the ground power supplying apparatus 2 is a main power transmission state where power is supplied to the power transmission side resonance circuit 43 and power is being transmitted to the vehicle 3 or a power transmission active state where weak power is supplied to the power transmission side resonance circuit 43 and power can be transmitted to the vehicle 3 and shifting the state of the ground power supplying apparatus 2 to the power transmission active state when the suspension condition is no longer satisfied if the state of the ground power supplying apparatus 2 is the standby state.

Further, the above embodiment can be interpreted as a program for making a processor 223 of a ground power supplying apparatus 2 having a power transmission side resonance circuit 43 (resonance circuit) and transmitting power to a vehicle 3 by noncontact shift a state of the ground power supplying apparatus 2 to a standby state where the supply of power to the power transmission side resonance circuit 43 is stopped and where the power transmission active state can be shifted to by supplying weak power to the power transmission side resonance circuit 43 when a predetermined suspension condition is satisfied if the state of the ground power supplying apparatus 2 is a main power transmission state where power is supplied to the power transmission side resonance circuit 43 and power is being transmitted to the vehicle 3 or a power transmission active state where weak power is supplied to the power transmission side resonance circuit 43 and power can be transmitted to the vehicle 3 and shift the state of the ground power supplying apparatus 2 to the power transmission active state when the suspension condition is no longer satisfied if the state of the ground power supplying apparatus 2 is the standby state and a nontransitory computer recording medium including that program.

The invention claimed is:

1. A ground power supplying apparatus configured to transmit power to a vehicle by noncontact,
   the ground power supplying apparatus comprising:
   a power transmission apparatus having a resonance circuit and configured to transmit power to the vehicle; and
   a control device provided with a processor configured to:
   shift a state of the ground power supplying apparatus to a standby state when a predetermined suspension condition is satisfied while the state of the ground power supplying apparatus is a main power transmission state or a power transmission active state; and
   shift the state of the ground power supplying apparatus to the power transmission active state when the suspension condition is no longer satisfied while the state of the ground power supplying apparatus is the standby state, wherein
   the main power transmission state is a state where power is supplied to the resonance circuit and power is being supplied to the vehicle,
   the power transmission active state is a state where weak power is supplied to the resonance circuit and power can be transmitted to the vehicle, and
   the standby state is a state where the supply of power to the resonance circuit is stopped and where the power transmission active state can be shifted to from the standby state by supplying weak power to the resonance circuit.

2. The ground power supplying apparatus according to claim 1, wherein
   the suspension condition is the condition that the transmission of power from the ground power supplying apparatus to the vehicle has to be temporarily suspended.

3. The ground power supplying apparatus according to claim 1, further comprising a position deviation detection device configured to detect position deviation between the power transmission apparatus and a power reception device mounted in the vehicle in a direction perpendicular to a direction of advance of the vehicle, wherein the suspension condition is that the position deviation is detected.

4. The ground power supplying apparatus according to claim 1, further comprising a communication device configured to communicate with a server, wherein
   the suspension condition is that communication between the server and the communication device is interrupted.

5. The ground power supplying apparatus according to claim 1, wherein
   the suspension condition is that the temperature of the power transmission apparatus is greater than or equal to a predetermined suspension reference temperature.

6. The ground power supplying apparatus according to claim 1, wherein
   the suspension condition is that the speed of the vehicle is greater than or equal to a predetermined suspension reference speed.

7. The ground power supplying apparatus according to claim 1, wherein
   the suspension condition is that there be a foreign object or living object present on a road at which the ground power supplying apparatus is provided.

8. The ground power supplying apparatus according to claim 1, wherein
   the suspension condition is that the power supplied to the resonance circuit is greater than or equal to a predetermined suspension reference value.

9. The ground power supplying apparatus according to claim 1, further comprising a narrow range communication device configured to directly communicate with the vehicle utilizing narrow range wireless communication, wherein
   the control device is configured to shift the state of the ground power supplying apparatus to a second standby state when a predetermined end condition is satisfied while the ground power supplying apparatus is the main power transmission state, the power transmission active state, or the standby state, and
   the second standby state is the state where the supply of power to the resonance circuit is stopped and where the power transmission active state can be shifted to from the second standby state when vehicle identification information of the vehicle is registered in a list of vehicle identification information of vehicles which might be supplied with power at the ground power supplying apparatus stored in the control device upon vehicle information being received from the vehicle by the narrow range communication device.

10. The ground power supplying apparatus according to claim 9, wherein
    the end condition is the condition that transmission of power from the ground power supplying apparatus to the vehicle has to be ended.

11. The ground power supplying apparatus according to claim 9, wherein
    the end condition is that the vehicle be detected as passing over a road at which the ground power supplying apparatus is provided.

12. The ground power supplying apparatus according to claim 9, wherein
    the end condition is that before one vehicle passes over a road at which the ground power supplying apparatus is provided, vehicle identification information is received by the narrow range communication device from another vehicle.

13. The ground power supplying apparatus according to claim 9, wherein the end condition is that the time in the power transmission active state or the standby state is greater than or equal to a predetermined time.

14. The ground power supplying apparatus according to claim 9, wherein
the end condition is that a malfunction of the ground power supplying apparatus is detected.

15. The ground power supplying apparatus according to claim 9, wherein
the end condition is that a coupling coefficient between the resonance circuit of the power transmission apparatus and another resonance circuit of the power reception apparatus mounted at the vehicle be greater than or equal to a predetermined end reference value.

16. The ground power supplying apparatus according to claim 9, wherein
the end condition is that a fee charged to a user of the vehicle calculated based on the power transmitted from the ground power supplying apparatus to the vehicle be greater than or equal to a predetermined upper limit fee.

17. The ground power supplying apparatus according to claim 9, wherein
the end condition is that transmission stop request signal be received by the narrow range communication device from the vehicle.

18. A method for controlling a ground power supplying apparatus having a resonance circuit and transmitting power to a vehicle by noncontact, wherein
the method for controlling a ground power supplying apparatus comprising:
shifting a state of the ground power supplying apparatus to a standby state when a predetermined suspension condition is satisfied while the state of the ground power supplying apparatus is a main power transmission state or a power transmission active state; and
shifting the state of the ground power supplying apparatus to the power transmission active state when the suspension condition is no longer satisfied while the state of the ground power supplying apparatus is the standby state, wherein
the main power transmission state is a state where power is supplied to the resonance circuit and power is being supplied to the vehicle,
the power transmission active state is a state where weak power is supplied to the resonance circuit and power can be transmitted to the vehicle, and
the standby state is a state where the supply of power to the resonance circuit is stopped and which can be shifted to the power transmission active state by supplying weak power to the resonance circuit.

19. A nontransitory computer recording medium including a program which, when executed, causes a processor of a ground power supplying apparatus having a resonance circuit and transmitting power to a vehicle by noncontact, to;
shift a state of the ground power supplying apparatus to a standby state where the supply of power to the resonance circuit is stopped and which can be shifted to a power transmission active state by supplying weak power to the resonance circuit, when a predetermined suspension condition is satisfied while the state of the ground power supplying apparatus is a main power transmission state where power is supplied to the resonance circuit and power is being transmitted to the vehicle or a power transmission active state where weak power is supplied to the resonance circuit and power can be transmitted to the vehicle; and
shift the state of the ground power supplying apparatus to the power transmission active state when the suspension condition is no longer satisfied while the state of the ground power supplying apparatus is the standby state.

* * * * *